US00RE48971E

(19) United States
(12) Reissued Patent
Hanrahan et al.

(10) Patent Number: US RE48,971 E
(45) Date of Reissued Patent: *Mar. 15, 2022

(54) REFRACTORY MOLD AND METHOD OF MAKING

(71) Applicant: HITCHINER MANUFACTURING CO., INC., Milford, NH (US)

(72) Inventors: Michael R. Hanrahan, Bedford, NH (US); Skip L. Patteuw, Wilton, NH (US)

(73) Assignee: Hitchiner Manufacturing Co., Inc., Milford, NH (US)

( * ) Notice: This patent is subject to a terminal disclaimer.

(21) Appl. No.: 16/198,147

(22) Filed: Nov. 21, 2018

Related U.S. Patent Documents

Reissue of:
(64) Patent No.: 9,498,819
Issued: Nov. 22, 2016
Appl. No.: 13/804,676
Filed: Mar. 14, 2013

(51) Int. Cl.

| | |
|---|---|
| ***B22C 7/02*** | (2006.01) |
| ***B22C 9/04*** | (2006.01) |
| ***B33Y 10/00*** | (2015.01) |
| ***B33Y 80/00*** | (2015.01) |
| ***B22C 1/00*** | (2006.01) |

(52) U.S. Cl.
CPC ..... *B22C 9/043* (2013.01); *B22C 1/00* (2013.01); *B22C 7/02* (2013.01); *B22C 9/04* (2013.01); *B33Y 10/00* (2014.12); *B33Y 80/00* (2014.12)

(58) Field of Classification Search
CPC .. B22C 9/082; B22C 7/02; B22C 9/04; B22C 9/043
See application file for complete search history.

(56) References Cited

U.S. PATENT DOCUMENTS

| | | | |
|---|---|---|---|
| 1,768,254 | A | 6/1930 | Hoy |
| 2,208,368 | A | 7/1940 | Hauck |
| 2,209,400 | A | 7/1940 | Hauck |
| 2,214,133 | A | 9/1940 | Hauck |
| 2,256,218 | A | 9/1941 | Seaver |
| 2,299,860 | A | 10/1942 | Stoody et al. |
| 2,415,620 | A | 2/1947 | Woock |

(Continued)

FOREIGN PATENT DOCUMENTS

| | | | |
|---|---|---|---|
| CN | 1079422 | A | 12/1993 |
| CN | 1082959 | A | 3/1994 |

(Continued)

OTHER PUBLICATIONS

International Search Report for PCT/US2014/014983; dated Jun. 3, 2014.

(Continued)

*Primary Examiner* — Carlos N Lopez
(74) *Attorney, Agent, or Firm* — BakerHostetler

(57) ABSTRACT

A refractory mold is disclosed. The refractory mold includes a fugitive pattern assembly comprising a hollow sprue that comprises a sprue wall disposed about a longitudinal axis; a pattern disposed outwardly of the sprue wall; and an outwardly extending gate attached to and extending between the sprue wall and the pattern, the hollow sprue, pattern and gate each formed from a fugitive material; and a refractory mold formed on and having a mold cavity defined by an outer surface of the fugitive pattern assembly.

24 Claims, 13 Drawing Sheets

(56) References Cited

U.S. PATENT DOCUMENTS

| | | | | |
|---|---|---|---|---|
| 2,442,718 | A | 6/1948 | Woock | |
| 2,448,640 | A | 9/1948 | Weston | |
| 2,829,408 | A | 4/1958 | Shuck | |
| 3,015,138 | A | 1/1962 | Watts | |
| 3,052,001 | A | 9/1962 | Brennan | |
| 3,117,346 | A | 1/1964 | Bertin et al. | |
| 3,835,913 | A * | 9/1974 | Vandemark et al. | 164/35 |
| 4,089,364 | A | 5/1978 | Hayes | |
| 4,108,931 | A | 8/1978 | Ogden | |
| 4,133,371 | A | 1/1979 | Birch et al. | |
| 4,315,537 | A | 2/1982 | Blazek | |
| 4,607,680 | A | 8/1986 | Mills et al. | |
| 5,069,271 | A | 12/1991 | Chandley et al. | |
| 5,119,865 | A | 6/1992 | Mae et al. | |
| 5,135,041 | A | 8/1992 | Goss | |
| 5,382,308 | A | 1/1995 | Bourell et al. | |
| 6,619,373 | B1 * | 9/2003 | Tooley et al. | 164/363 |
| 6,880,615 | B2 | 4/2005 | Cser | |
| 7,231,955 | B1 | 6/2007 | Bullied et al. | |
| 8,443,867 | B2 | 5/2013 | Ishihara | |
| 9,486,852 | B2 * | 11/2016 | Hanrahan | B22C 7/02 |
| 9,833,833 | B2 * | 12/2017 | Hanrahan | B22C 1/00 |
| 2001/0032713 | A1 | 10/2001 | Penn et al. | |
| 2004/0054692 | A1 | 3/2004 | Seyrat et al. | |
| 2008/0014459 | A1 | 1/2008 | Przeslawski et al. | |
| 2010/0006252 | A1 | 1/2010 | Roby | |

FOREIGN PATENT DOCUMENTS

| | | | |
|---|---|---|---|
| CN | 1114923 | A | 1/1996 |
| CN | 2392626 | Y | 8/2000 |
| CN | 1390662 | A | 1/2003 |
| CN | 101011724 | A | 8/2007 |
| DE | 1608686 | B1 | 10/1969 |
| DE | 4440397 | C1 | 9/1995 |
| DE | 44440397 | C1 | 9/1995 |
| EP | 0063883 | A1 | 11/1982 |
| GB | 1140159 | A | 1/1969 |
| JP | 58-13435 | A | 1/1983 |
| JP | 63-194839 | A | 8/1988 |
| JP | 63-212039 | | 9/1988 |
| JP | 63-212039 | A | 9/1988 |
| JP | 02-055639 | | 2/1990 |
| JP | H-02-055639 | A | 2/1990 |
| JP | H-02-192844 | A | 7/1990 |
| JP | H-04-270024 | A | 9/1992 |
| JP | H-07-088594 | A | 4/1995 |
| JP | H-08-509666 | A | 10/1996 |
| JP | 2009050917 | A | 3/2009 |
| JP | 2009534193 | A | 9/2009 |
| JP | 2011058579 | A | 3/2011 |
| JP | 2011136361 | A | 7/2011 |
| KR | 1020070078777 | A | 8/2007 |
| KR | 1020130000510 | A | 3/2013 |
| WO | 01/32331 | A1 | 5/2001 |
| WO | 2007/123874 | A2 | 11/2007 |

OTHER PUBLICATIONS

International Search Report for PCT/US2014/014987; dated Apr. 24, 2014.

International Search Report for PCT/US2014/015003; dated May 20, 2014.

International Preliminary Report on Patentability for PCT/US2014/014983; dated Sep. 15, 2015.

International Preliminary Report on Patentability for PCT/US2014/014987; dated Sep. 15, 2015.

International Preliminary Report on Patentability for PCT/US2014/015003; dated Sep. 15, 2015.

Chinese Office Action for CN Patent Application No. 201480013438.1; dated May 5, 2016.

Chinese Office Action for CN Patent Application No. 201480013174.X; dated Jul. 4, 2016.

Chinese Office Action for CN Patent Application No. 201480015496.8; dated Jul. 4, 2016.

Korean Office Action for KR Patent Application No. 10-2015-7026144; dated Jul. 5, 2016.

Korean Office Action for KR Patent Application No. 10-2015-7026145; dated Jul. 5, 2016.

DE4440397 English Language Abstract extracted from espacenet.com on Jul. 3, 2014.

* cited by examiner

REFRACTORY MOLD AND METHOD OF MAKING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The subject invention relates generally to a refractory mold for use in casting and a method of making the mold, and more particularly to a refractory mold for use in investment casting, including countergravity investment casting, and a method of making the mold.

BACKGROUND

Investment casting, particularly countergravity investment casting, utilizes pattern assemblies of the articles to be cast that are formed from a fugitive or removable material. These pattern assemblies are invested with a refractory particulate material to form a refractory shell. The fugitive material is removed from the refractory shell and the particulate material is fired to form the investment casting mold. These refractory molds are then used for investment casting of various molten metals and alloys having a shape defined by the pattern assemblies.

The pattern assemblies used in investment casting, particularly countergravity investment casting, have generally been formed by attaching one or more patterns of the article or articles to be formed to a central sprue. Each of the patterns are generally connected to the central sprue by one or more gates that are used to define passageways in the refractory mold for the purpose of feeding molten metal provided through the passageway defined in the mold by the central sprue to the various mold cavities defined by the patterns. The patterns and gates are frequently attached to a central sprue manually in a radially-extending manner as part of the patternmaking process. Where the pattern assembly is formed from wax, the patterns and gates may be attached by wax welding. While this is and has been a very effective process in many respects, the number of patterns that may be attached to the central sprue and thus the number of parts that can be made from a particular pattern assembly is generally limited by the size of the patterns, gates and sprue, and particularly by the sprue diameter, because it defines the number of patterns/gates that may be attached as well as the amount of molten material that may be supplied through the gates to the patterns. As such, pattern assemblies that utilize centralized sprues are limited with respect to their resultant casting yields by the characteristics of the sprue selected, and particularly by the sprue diameter and its length.

Since it is generally very advantageous to increase casting yields from a particular pattern assembly, the development of improved pattern assemblies, methods of making pattern assemblies, associated refractory molds and methods of making the refractory molds to provide improved castings and casting methods are very desirable.

SUMMARY OF THE INVENTION

In one exemplary embodiment, a refractory mold is disclosed. The refractory mold includes a fugitive pattern assembly comprising a hollow sprue that comprises a sprue wall disposed about a longitudinal axis; a pattern disposed outwardly of the sprue wall; and an outwardly extending gate attached to and extending between the sprue wall and the pattern, the hollow sprue, pattern and gate each formed from a fugitive material; and a refractory mold formed on and having a mold cavity defined by an outer surface of the fugitive pattern assembly.

In another exemplary embodiment, a method of making a refractory mold is disclosed. The method includes forming a fugitive pattern assembly comprising a hollow sprue that comprises a sprue wall disposed about a longitudinal axis; a pattern disposed outwardly of the sprue wall; and an outwardly extending gate attached to and extending between an outer surface of the sprue wall and the pattern, the hollow sprue, pattern and gate each formed from a fugitive material. The method also includes depositing a refractory mold on an outer surface of the fugitive pattern assembly, the refractory mold having a mold cavity defined by the outer surface of the fugitive pattern assembly.

In yet another exemplary embodiment, a method of making a refractory mold is disclosed. The method includes 3D printing a particulate refractory material to form a refractory mold comprising a mold cavity, the mold and mold cavity comprising a hollow sprue portion that comprises a sprue wall disposed about a longitudinal axis; a pattern portion disposed outwardly of the sprue wall portion; and an outwardly extending gate portion attached to and extending between an outer surface of the sprue wall portion and the pattern portion.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
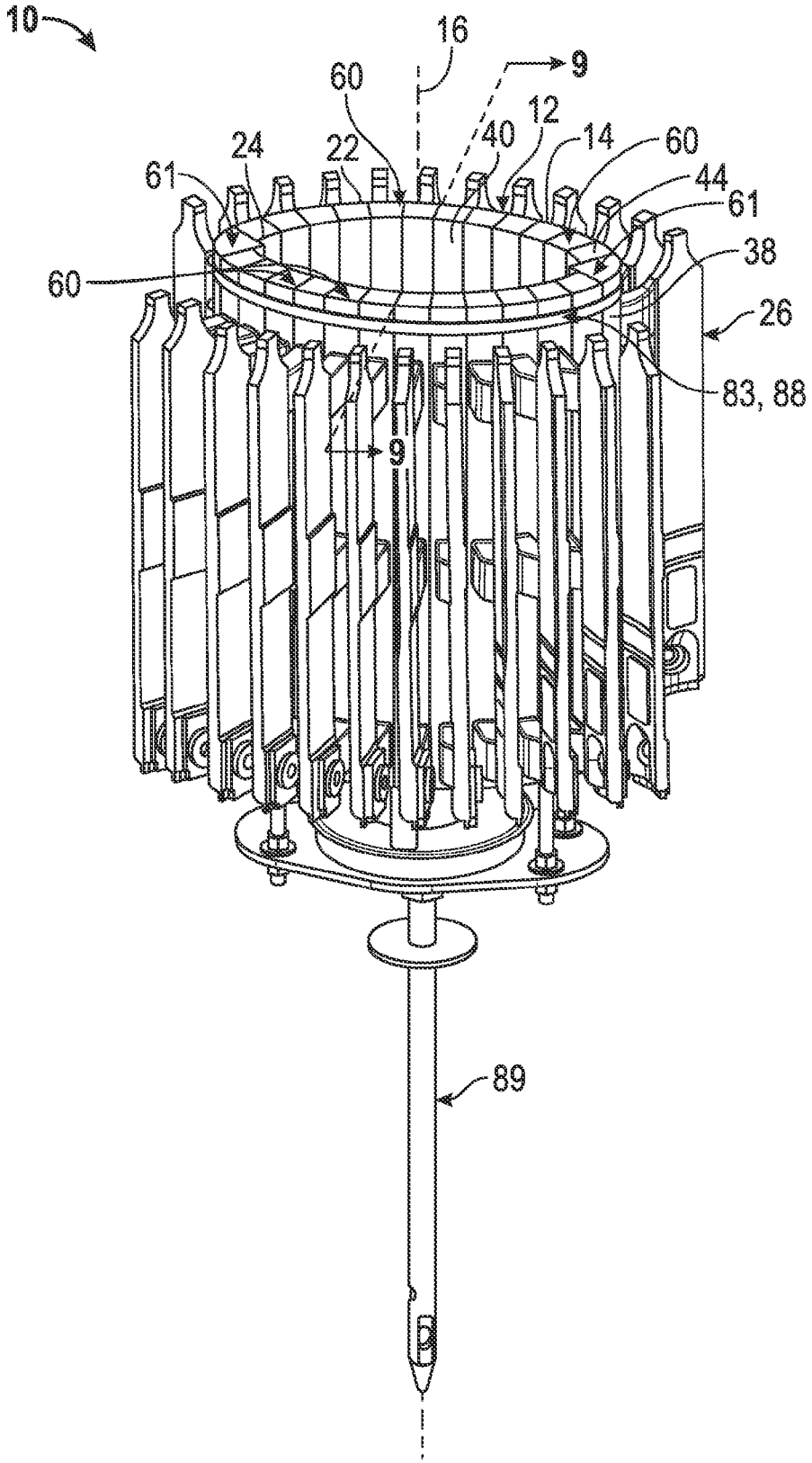
FIG. 1 is a perspective view of an embodiment of a radial pattern assembly as disclosed herein.

The following description is merely exemplary in nature and is not intended to limit the present disclosure, its application or uses. It should be understood that throughout the drawings, corresponding reference numerals indicate like or corresponding parts and features.

Referring to the Figures, and more particularly to FIGS. 1 and 2, a radial pattern assembly 10 is disclosed. The radial pattern assembly 10 includes a hollow sprue 12 comprising a sprue wall 14 disposed about a longitudinal axis 16. The sprue wall 14 has a thickness 18, a length or height 20, an outer periphery 22 and an inner periphery 24. The radial pattern assembly 10 also includes a pattern 26 disposed radially outwardly of the sprue wall 14 and a radially outwardly extending gate 28 attached to and extending between the sprue wall 14 and the pattern 26. The hollow sprue 12, sprue wall 14, pattern 26 and gate 28 are each formed from a fugitive material 58, which may also be described as a fugitive, expendable or otherwise removable material, as described herein. As illustrated in FIG. 1, the radial pattern assembly 10 may include a plurality of patterns 26 and a plurality of gates 28 attached to and extending between the sprue wall 14 and the patterns 26. As used herein, the terms "radial" and "radially" are intended to be understood very broadly in their description of the elements with which they are employed, and include, but are not limited to, location or extension of the elements modified by these terms along a radius about a central point or axis. These terms more broadly include outward or inward location or extension of certain elements with regard to other elements. For example, if a sprue wall 14 has a non-cylindrical shape, such as a rectangular peripheral shape, not all gates (and associated patterns) attached orthogonally to the sprue wall 14 about the periphery, either outwardly or inwardly, would extend along a radius from a common point or longitudinal axis, but all may be said to radiate from the sprue wall, and the terms "radial" and "radially" as used herein are intended to also broadly include the outward or inward extension of gates 28, 34; patterns 26, 32; runners 62 and other elements described herein from the sprue wall 14, regardless of the manner in which they are located or extend. In another example, an outwardly extending gate 28 or inwardly extending gate 34 may extend along a gate axis, but the axis need not be a radius about a central point or axis, and it can be curved or extend in a manner other than a straight line.

The radial pattern assembly 10 and hollow sprue 12 are an improvement over related art assemblies having a solid central sprue because the hollow sprue 12 enables the surface area of the outer surface of the sprue wall 14 to be increased and enables attachment of more gates and patterns to the sprue without necessarily increasing the amount of material required to fill the sprue as occurs as the diameter of a solid sprue is increased. The radial pattern assembly 10 and hollow sprue 12 may be used to advantageously increase the number of patterns that may be attached to the sprue and the casting yield therefrom. Another advantage of radial pattern assembly 10 is that the hollow sprue 12 and sprue wall 14 may also be selected to include a predetermined thickness 18, length 20, outer periphery 22 and inner periphery 24 that provides a mold with a sprue cavity that enables feeding the patterns 26 and gates 28 attached to the sprue wall 14, including the increased pattern density provided by the radial pattern assembly 10, as well as substantially complete flow-back of the molten material from the sprue cavity after the mold is cast and the pattern cavities in the patterns have been filled, as described herein. Yet another advantage of the radial pattern assembly 10 is that the use of the hollow sprue 12 also enables placement of second patterns 32 and second gates 34 radially inwardly of the sprue wall 14. As yet another advantage, the sprue wall 14 may incorporate various predetermined features that may be used to enhance the metallodynamic flow of the molten metal within the mold cavity, particularly to ensure filling of the pattern cavities, as described herein. In this way, the radial pattern assembly 10 and hollow sprue 12 may be used to further increase the number of patterns 26 that may be attached to the sprue and further increase the casting yield of parts cast therefrom.

Figure 2A:
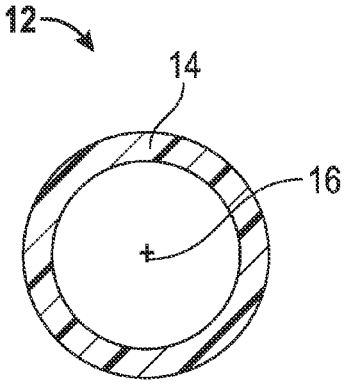
FIGS. 2A-2H are representative lateral cross-sectional views of various embodiments of hollow sprues and sprue walls for use in radial pattern assemblies as disclosed herein.
Figure 2B:
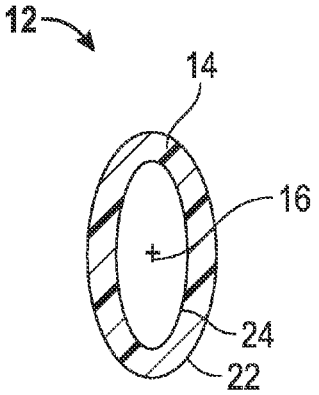
Figure 2C:
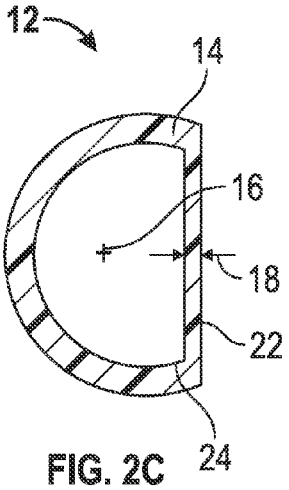
Figure 2D:
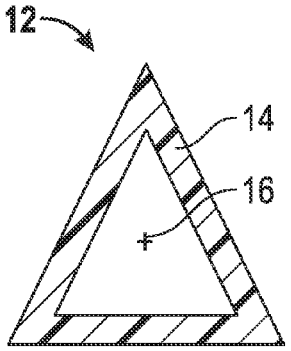
Figure 2E:
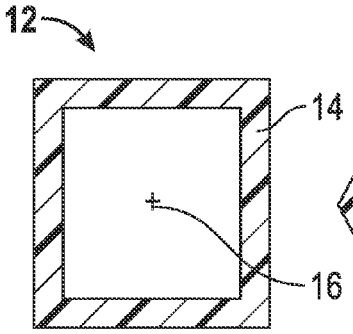
Figure 2F:
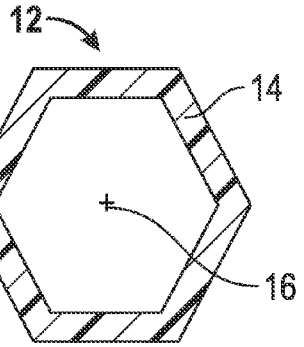
Figure 2G:
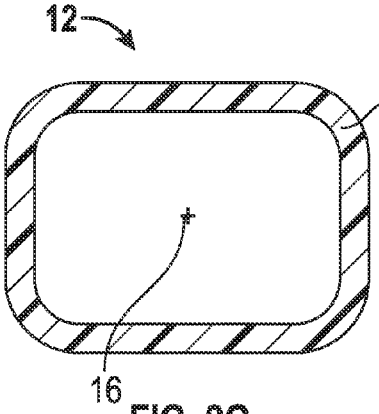
Figure 2H:
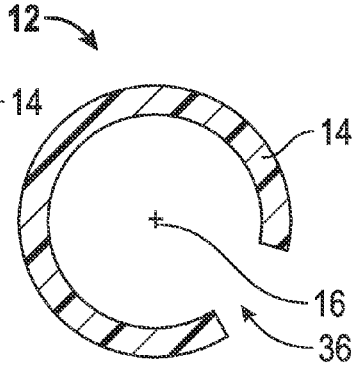
Figure 3A:
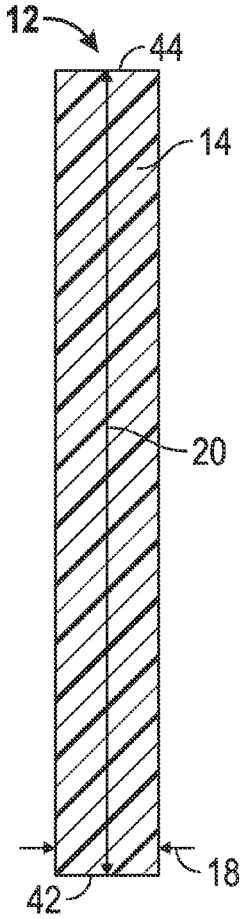
FIGS. 3A, 3B and 3C are representative axially-extending cross-sectional views of various embodiments of hollow sprues and sprue walls for use in radial pattern assemblies as disclosed herein.
Figure 3B:
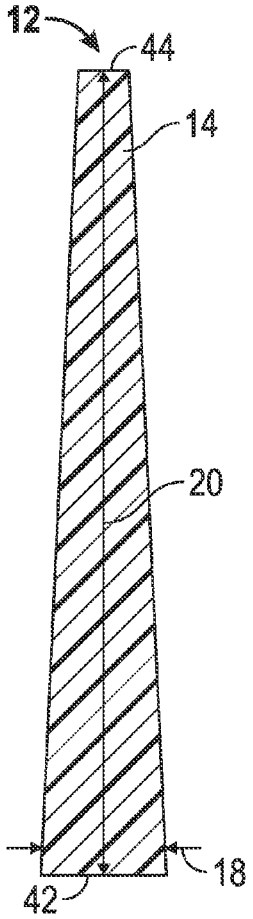
Figure 3C:
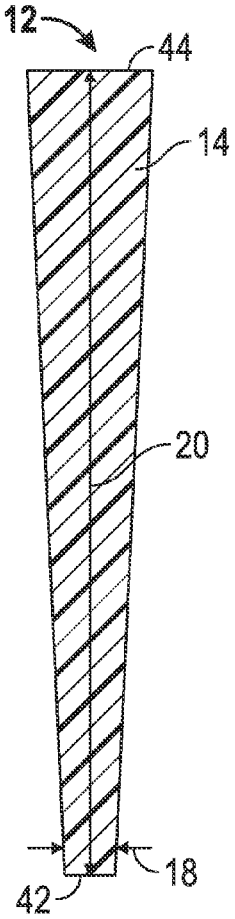
Figure 4A:
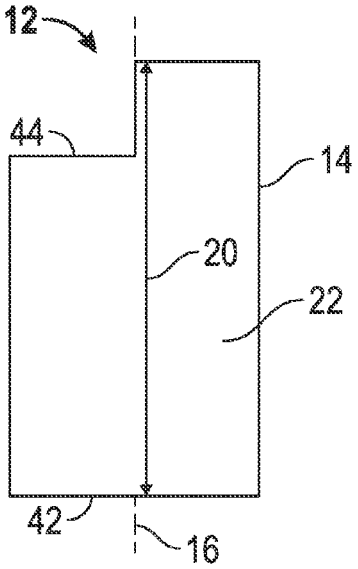
FIGS. 4A and 4B are representative front views of various embodiments of hollow sprues and sprue walls for use in radial pattern assemblies where the sprue wall height varies around the periphery as disclosed herein.
Figure 4B:
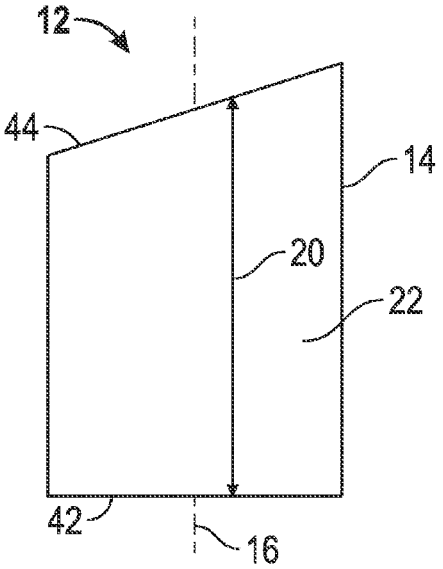

As shown in FIGS. 2A-2H and 3A-3C, in exemplary embodiments, the hollow sprue 12 and sprue wall 14 may comprise any suitable hollow body having surfaces suitable for the attachment of gates 28 and patterns 26 and have any suitable hollow shape, including various curved or polyhedral shapes (including flat planar surfaces), or a combination thereof. This may include, in various embodiments, many cylindrical shapes (FIG. 2A), particularly right cylindrical shapes, including various circular (FIG. 2A), elliptical (FIG. 2B), arcuate (defined by a combination of intersecting arcs or curves, FIGS. 2C and 2H), rounded rectangular (FIG. 2G), rectangular (FIG. 2E), triangular (FIG. 2D) and other polyhedral cylindrical shapes, or regular or irregular curved cylindrical shapes, and the like, as illustrated in FIGS. 2C and 2H by the use of representative peripheral cross-sectional views that are generally orthogonal to the longitudinal axis. These representative forms are only exemplary; many other polyhedral and curved peripheral cross-sectional forms, and combinations thereof, are possible. The hollow sprue 12 may be defined by a sprue wall 14 that is completely closed, such that it completely encloses the longitudinal axis 16, as shown in the examples of FIGS. 2A-2G, or may be substantially closed, such that it substantially encloses the longitudinal axis 16, as shown in the example of FIG. 2H. The hollow sprue 12 and sprue wall 14 have a predetermined thickness 18, length 20 and an outer periphery 22 and an inner periphery 24, which may be either constant or variable with respect or reference to one another. In one exemplary embodiment, as illustrated, for example, in FIGS. 2A-2G, the thickness 18, length 20, outer periphery 22 and inner periphery 24 are substantially constant with respect to one another. In other embodiments, the thickness 18 may be constant (FIG. 2A-2G, FIG. 3A) or vary along the length 20 (FIGS. 3B and 3C) or the periphery 22 (FIG. 2C), or both of them, in any manner as illustrated by the examples of FIGS. 2A-2H and FIG. 3A-3C. The thickness 18 may vary along the length by increasing in thickness upwardly toward the upper end 44 of the sprue wall 14 (FIG. 3C) or by decreasing in thickness upwardly (FIG. 3B). Likewise, in other embodiments, the length 20 may vary around the periphery 22, as illustrated in FIGS. 4A (stepwise) and 4B (continuous). The variations shown are only exemplary; many other variations in the shape and form of the hollow sprue 12, including the thickness 18, length 20, outer periphery 22 and inner periphery 24, are possible.

Figure 5A:
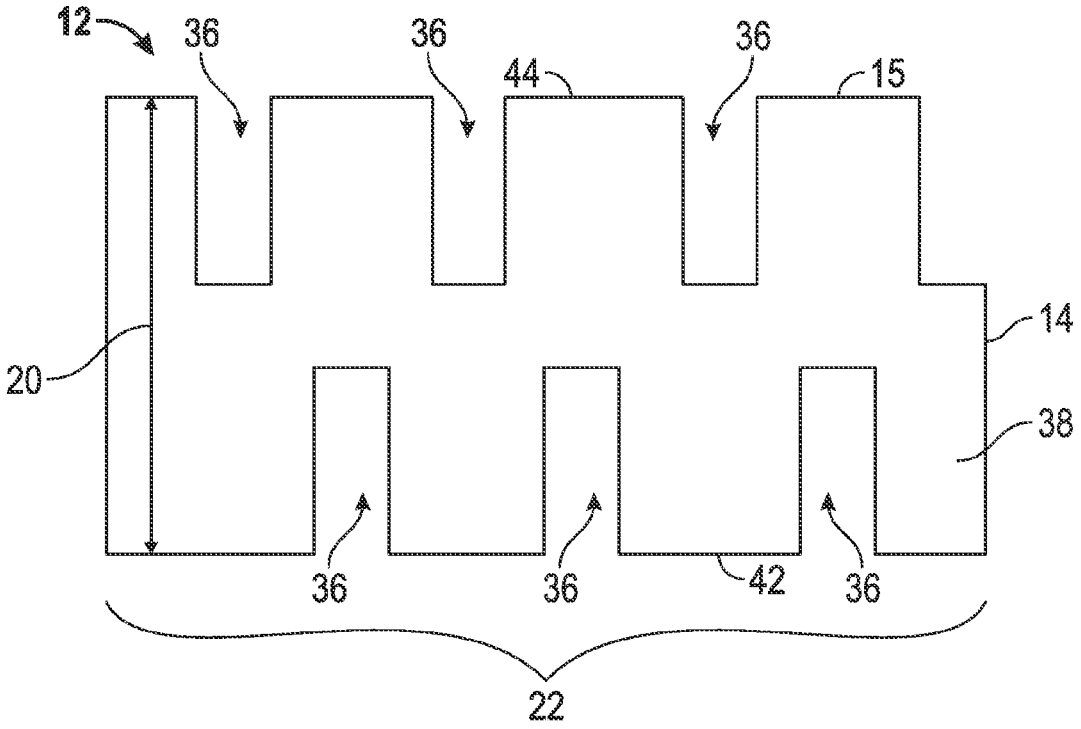
FIGS. 5A and 5B are representative flat projections of the outer periphery of various embodiments of hollow sprues and sprue walls having openings therethrough for use in radial pattern assemblies as disclosed herein.
Figure 5B:
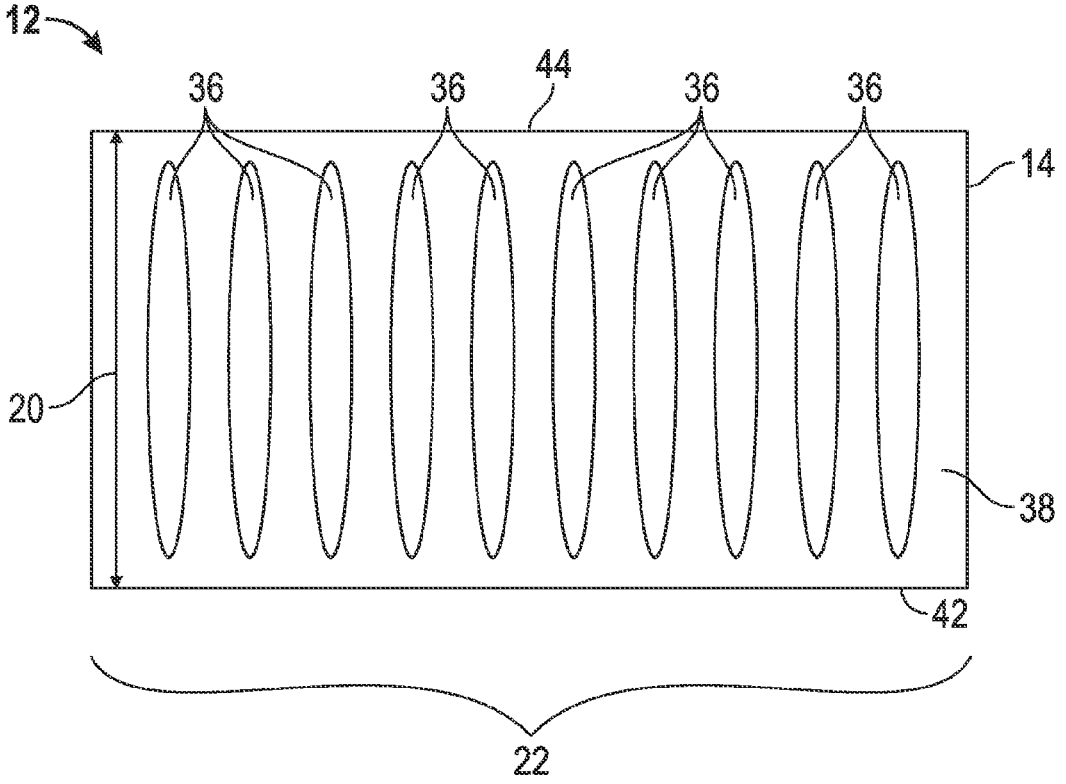

In one embodiment, the sprue wall 14 may be a continuous wall such that the wall is a solid closed form completely surrounding the longitudinal axis 16 of the hollow sprue 12 as illustrated, for example, in FIG. 1. Alternately, in other embodiments, the sprue wall 14 may be a substantially closed form that includes one or more openings 36 that extend through the sprue wall 14 from the outer surface 38 to the inner surface 40, as illustrated, for example, in FIGS. 2H, 5A and 5B. Openings 36 may extend inwardly from one or both of the lower end 42 or upper end 44 of the sprue wall 14 (FIG. 5A), or may be located entirely within the sprue wall 14 between the lower end 42 and upper end 44 (FIG. 5B). As a further alternate embodiment, the sprue wall 14 may have an opening 36 that extends from the lower end 42 to the upper end 44 through the entire length 20 (FIGS. 2H and 6A), such that the sprue wall 14 is not a closed form around the outer periphery 22 and inner periphery 24. Regardless of whether the sprue wall 14 is a solid closed form or contains one or more openings 36, the sprue wall 14 may include one or more recesses 48 that extend inwardly from the outer surface 38 or inner surface 40, or both surfaces, or protrusions 50 that extend outwardly from the outer surface 38 or inner surface 40, or both surfaces, or a combination of recesses 48 and protrusions 50.

The hollow sprue 12 and sprue wall 14, including the overall shape form and predetermined thickness 18, length 20, outer periphery 22 and inner periphery 24, as well as the incorporation of openings 36, recesses 48 and protrusions 50, may be selected to provide a refractory mold that promotes predetermined metallodynamic flow of the molten metal within the mold during casting. This includes flow to and throughout the mold cavity or cavities, particularly the passageway(s) defined within the sprue wall 14 and the passageways in the gate(s) 28 and the pattern(s) 26 cavities, to fill them during casting, as well as return flow back through the mold cavity, particularly the gate passageway and sprue wall passageways in the case of countergravity casting once the pressure used to fill the pattern cavities has been released. These features may be used to tailor the metallodynamic flow with the mold cavity during and/or after casting, including increasing or decreasing the flow rate or the volume of the flow in a particular portion of the mold cavity, as well as the flow characteristics (e.g. laminar or turbulent flow). In the case of countergravity casting, once the pattern cavities are filled, it is very desirable to return as much of the molten metal from the other portions of the mold, including the gates and sprue wall as possible without negatively affecting the patterns, i.e. leaving the pattern cavities completely filled.

Figures 6A, 6B:
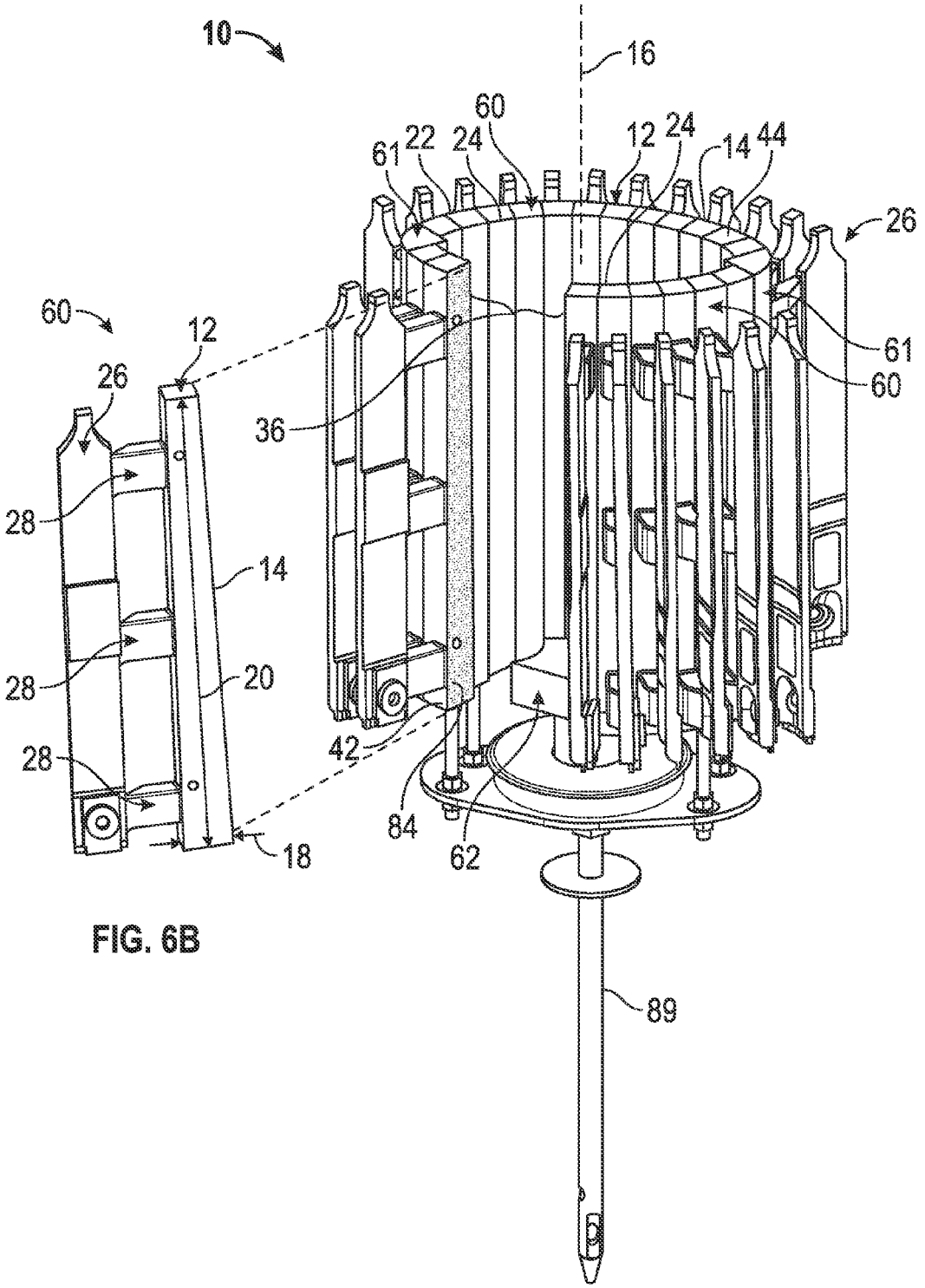
FIG. 6A is a perspective view of an embodiment of a radial pattern assembly having an opening therethrough as disclosed herein.
FIG. 6B is a perspective view of an axially-extending segment removed from the radial pattern assembly of FIG. 6A having an axially-extending sprue wall portion as disclosed herein.
Figure 7:
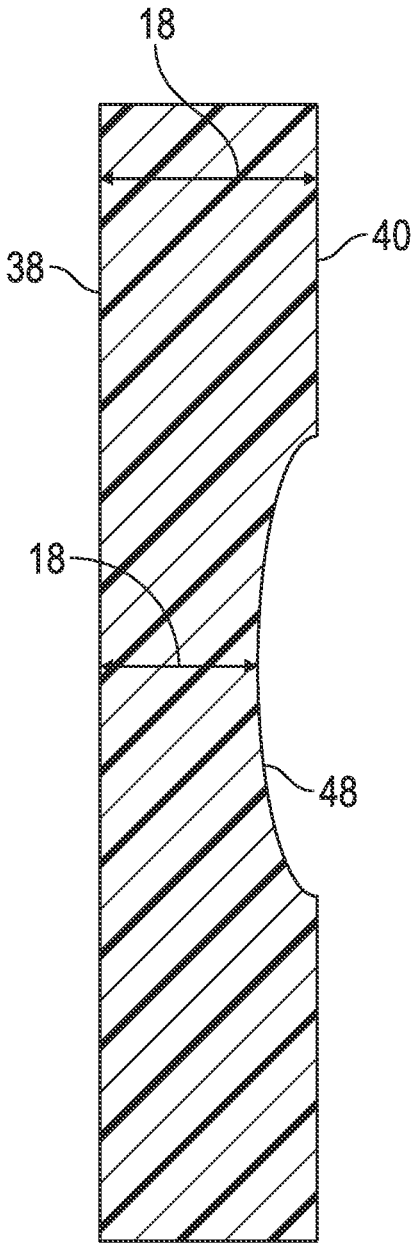
FIG. 7 is a representative axially-extending cross-sectional view of an embodiment of a hollow sprue and sprue wall for use in radial pattern assembly having a recess that varies the thickness along the height and about the inner and outer periphery as disclosed herein.
Figure 8:
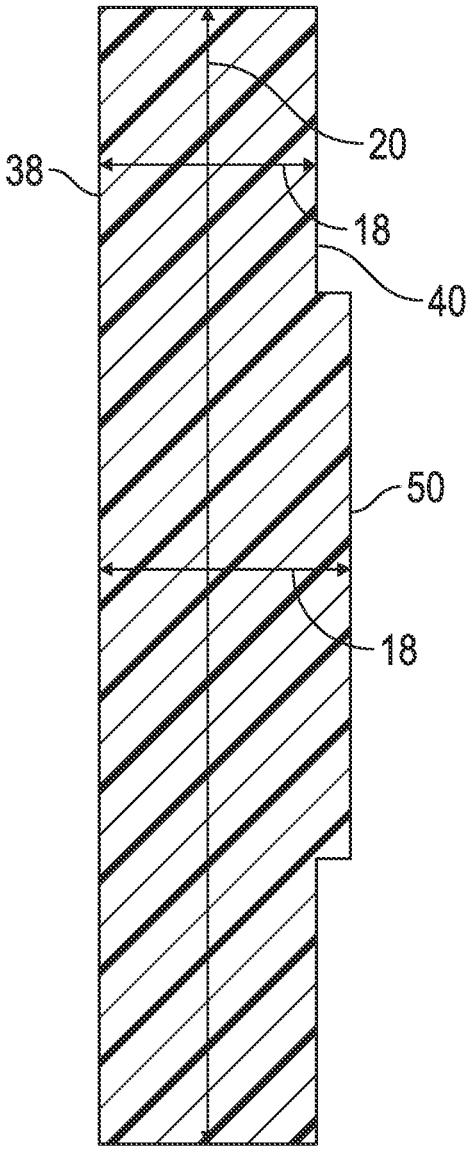
FIG. 8 is a representative axially-extending cross-sectional view of an embodiment of a hollow sprue and sprue wall for use in radial pattern assembly having a protrusion that varies the thickness along the height and about the inner and outer periphery as disclosed herein.
Figure 9:
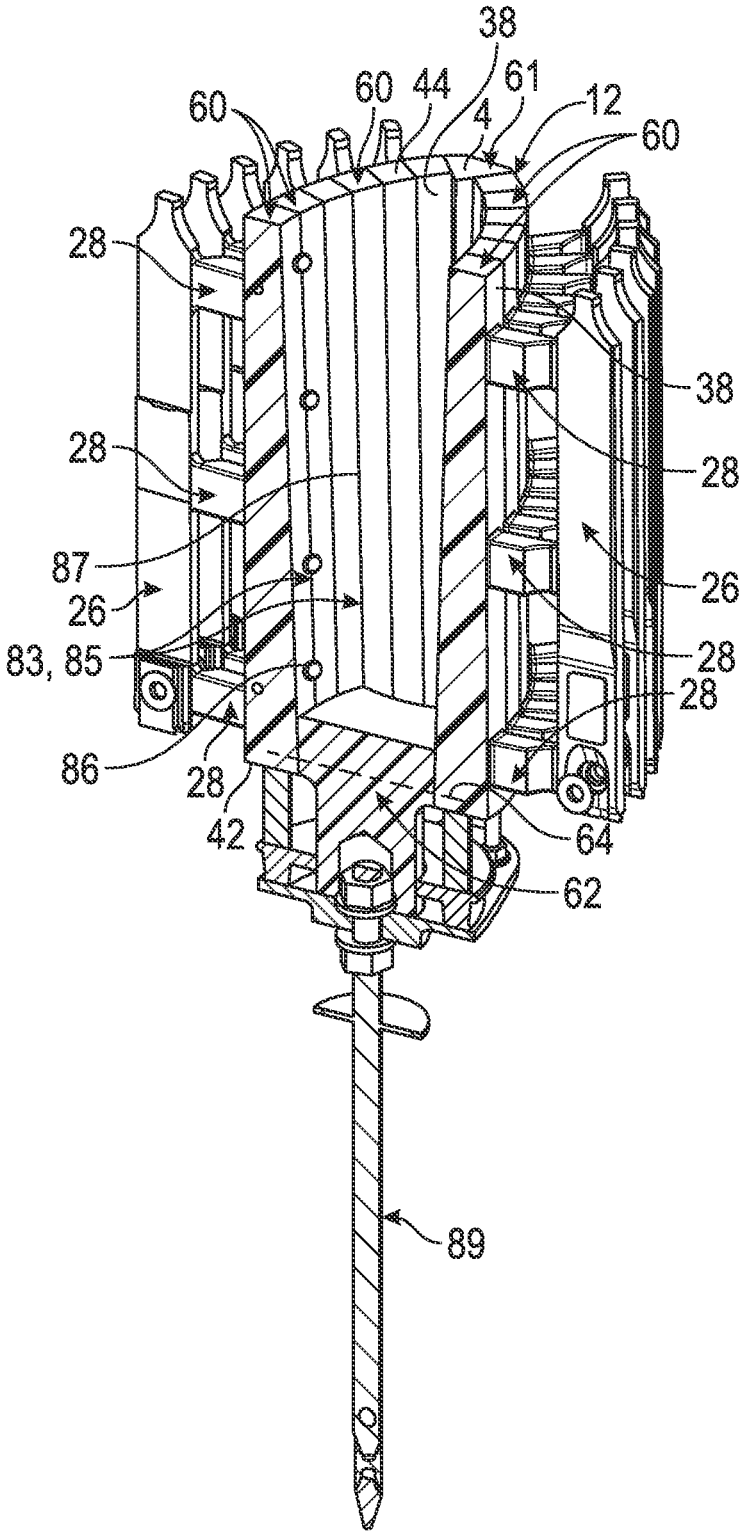
FIG. 9 is a representative axially-extending cross-sectional perspective view of the hollow sprue and sprue wall and runner of the radial pattern assembly of FIG. 1.

In one embodiment, the pattern assembly 10 includes a radially outwardly extending gate 28 attached to and extending between the sprue wall 14 and the pattern 26. This includes at least one gate 28 for each pattern 26. In another embodiment, a plurality of a radially outwardly extending gates 28 may be attached to and extend between the sprue wall 14 and each pattern 26. The gate 28 or gates 28 extend radially outwardly from the sprue wall 14. They may extend radially outwardly from the sprue wall 14 to the pattern 26 in any manner or orientation. In one embodiment, the gate 28 or gates 28 extend radially outwardly along a gate axis 52 that extends radially outwardly substantially perpendicular to the longitudinal axis 16. In other embodiments, the gate 28 or gates 28 may extend radially outwardly along a gate axis 52 that extends radially outwardly in a manner that is substantially non-perpendicular to the longitudinal axis 16. The number of gates 28 attached to each pattern, as well as their other characteristics, including their cross-sectional shape, cross-sectional area, length and the like, may be selected to provide gate passageways sufficient to fill the pattern cavities. Design of the gates 28 and corresponding gate passageways or cavities may take a number of factors into consideration, including the size, shape, orientation, spatial placement, heat transfer and other characteristics of the patterns and pattern cavities within the mold. In one embodiment, a plurality of gates 28 for each of a plurality of identical patterns 26 may be the same, including having the same number of gates attached in the same location on each pattern, where the gates having the same location on respective patterns are identical, as illustrated in FIGS. 1, 6A and 9. In this embodiment, since the gate 28 or gates 28 for each of the patterns 26 are the same, the gates 28/patterns 26 may be spaced uniformly about the outer surface 38 of the sprue wall 14 along the length and around the outer periphery 22 of the sprue wall 14, as shown in FIG. 1. Many other arrangements are possible. Alternately, in the case of a plurality of gates 28/patterns 26 that are the same as described above, the gates 28/patterns 26 may be staggered along the length of the outer surface 38 in a predetermined pattern, such as alternating the gate length of adjacent patterns 26 (which may be identical or different) so that adjacent patterns 26 are spaced closer to or farther from the outer surface 38 of the sprue wall 14. These alternate arrangements may be utilized in some instances to increase the packing density of the patterns 26. The embodiments described above are merely exemplary, and many other predetermined arrangements of gates 28/patterns 26 using the hollow sprue 12 are possible. When a plurality of patterns 26 are attached by gates 28 to the sprue wall 14, they may include a plurality of the same pattern 26 as illustrated, for example, in FIG. 1, or a plurality of different patterns 26 as illustrated, for example, in FIG. 13, or a combination thereof.

Figure 10:
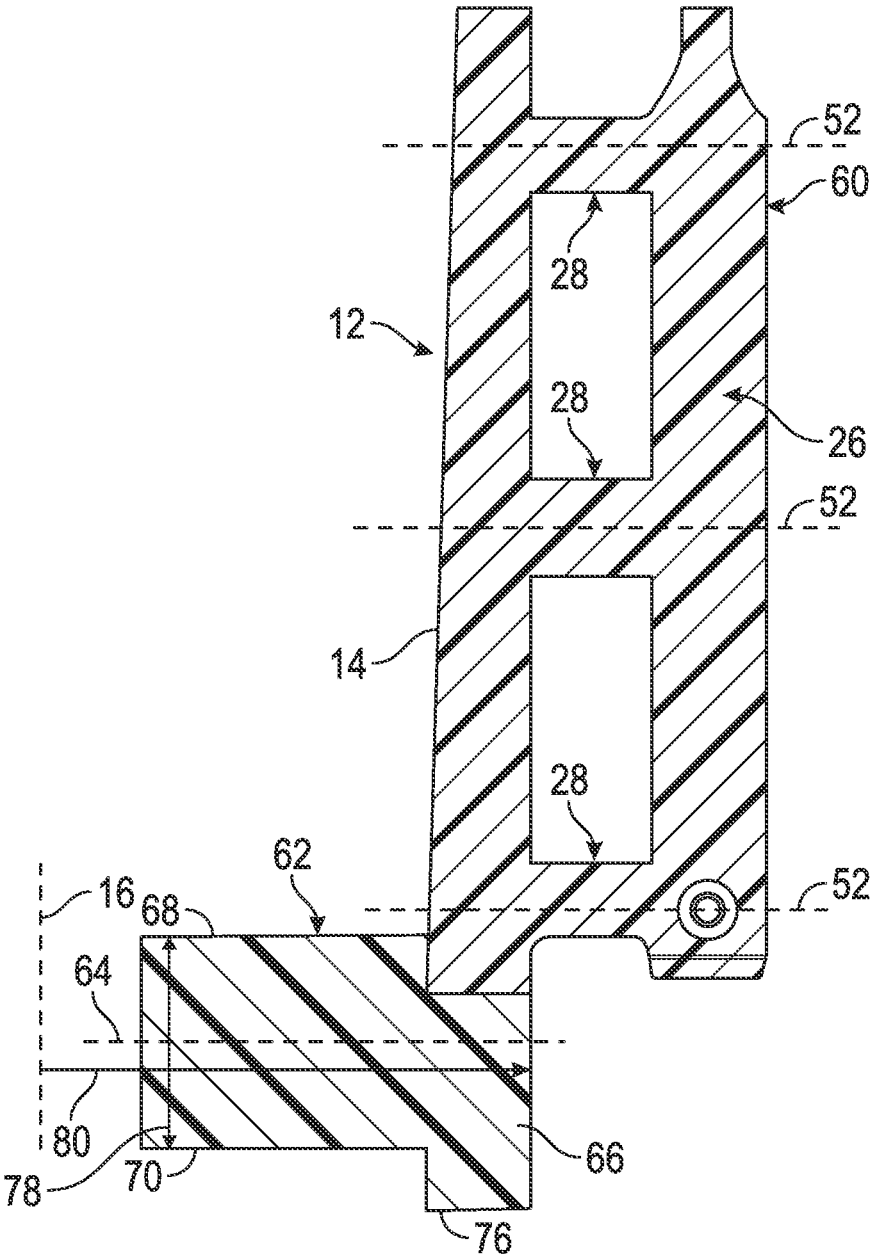
FIG. 10 is a representative cross-sectional perspective view of an embodiment of an axially-extending pattern segment and runner as disclosed herein.

In one embodiment, the pattern assembly 10 may include a radially inwardly extending second gate 34 or inner gate attached to and extending between the sprue wall 14 and the second pattern 32 or inner pattern. This includes at least one second gate 34 for each pattern 32. In another embodiment, a plurality of a radially inwardly extending second gates 34 may be attached to and extend between the sprue wall 14 and each second pattern 32. The second gate 34 or second gates 34 extend radially inwardly from the sprue wall 14 toward the longitudinal axis 16. They may extend radially inwardly from the sprue wall 14 to the second pattern 32 in any manner or orientation. In one embodiment, the second gate 34 or second gates 34 extend radially inwardly along a second gate axis 54. The second gate axis 54 may extend radially inwardly substantially perpendicular to the longitudinal axis 16 or in other orientations analogous to those described herein for gate axis 52. The number of second gates 34 attached to each second pattern 32, as well as their other characteristics, including their cross-sectional shape, cross-sectional area, length and the like, may be selected to provide second gate passageways sufficient to fill the second pattern cavities. Design of the second gates 34 and corresponding second gate passageways or second cavities may take a number of factors into consideration, including the size, shape, orientation, spatial placement, heat transfer and other characteristics of the second patterns 32 and second pattern cavities within the mold. In this embodiment, since the second gate 34 or second gates 34 for each of the second patterns 32 are the same, the second gates 34/second patterns 32 may be spaced uniformly about the inner surface 40 of the sprue wall 14 along the length 20 and around the inner periphery 24 of the sprue wall 14, as shown in FIG. 10. Many other arrangements are possible analogous to those described above for arrangement of the patterns 26 and gates 28, except that the arrangements are located within the inner periphery 24. Second patterns 32 and second gates 34 may be utilized with or without patterns 26 and gates 28. In one embodiment, both patterns 26 and second patterns 32 may be incorporated to further increase the casting yield compared to casting yields that may be realized using either patterns 26 or second patterns 32 separately. In another embodiment, second patterns 32 may be used separately, without patterns 26, so that the only patterns are located within the inner periphery 24 of the sprue wall 14. As with patterns 26, the second patterns 32 in a given pattern assembly 10 may be the same or different patterns in any arrangement.

The pattern assembly 10, including the hollow sprue 12, pattern(s) 26 and gate(s) 28, as well as any second pattern(s) 32 and second gate(s) (34), is formed from a fugitive material 58 (or alternately from a plurality of different fugitive materials 58) which is expendable or removable and is selected so that it may be selectively removed once the refractory mold 90 comprising a shell of a refractory material 92 has been formed on the pattern assembly 10. Fugitive material 58 may also be referred to as an expendable or removable material. Fugitive material 58 may include any material that is configured for removal from the refractory mold 90, and may include a wax, polymer, metal, ceramic, clay, wood or inorganic material, or a combination thereof. Fugitive material 58 may be configured for selective removal by any suitable method or means, including by heating the material to pyrolize or melt the fugitive material 58, for example. Removal may also be accomplished using a suitable solvent to dissolve the fugitive material, including various organic or inorganic solvents, acids and the like. In one embodiment, the fugitive material may include a pattern wax, including various commercially available pattern waxes. Polymers may include, for example, expanded polystyrene. Metals may include any suitable fugitive metal, particularly relatively low melting point metals such as Pb, Sn, Bi or Sb, or alloys thereof. Inorganic materials may include, for example, plaster of Paris. The pattern assembly 10 may be formed from the fugitive material 58 as a single piece, including the hollow sprue 12, pattern(s) 26 and gate(s) 28, or may be formed as a plurality of pieces that are assembled together to form the pattern assembly 10. When assembled as a plurality of pieces, the hollow sprue 12, pattern(s) 26 and gate(s) 28 may each be formed separately and assembled together as described herein, or alternately, one or more of a portion 15, 17 or section of the sprue wall 14, pattern(s) 26 and gate(s) 28 may be formed together as a pattern segment 60 of the assembly, and these segments may be joined together to form the pattern assembly 10, as described herein and illustrated in FIG. 1, for example. Whether formed as a single piece, as separate components, or as segments, as described herein, the constituent parts of the pattern assembly 10 formed in any suitable manner, including various forms of casting or molding, or various subtractive process (e.g. machining,) to form a subtractively-formed body or additive processes (e.g. stereo lithography (SLA), laser engineered net shaping (LENS), three dimensional printing or other rapid prototyping/manufacturing methods used to form three-dimensional objects from three-dimensional computer aided design (CAD) data to form an additively-formed body, or a combination thereof.

Figure 11:
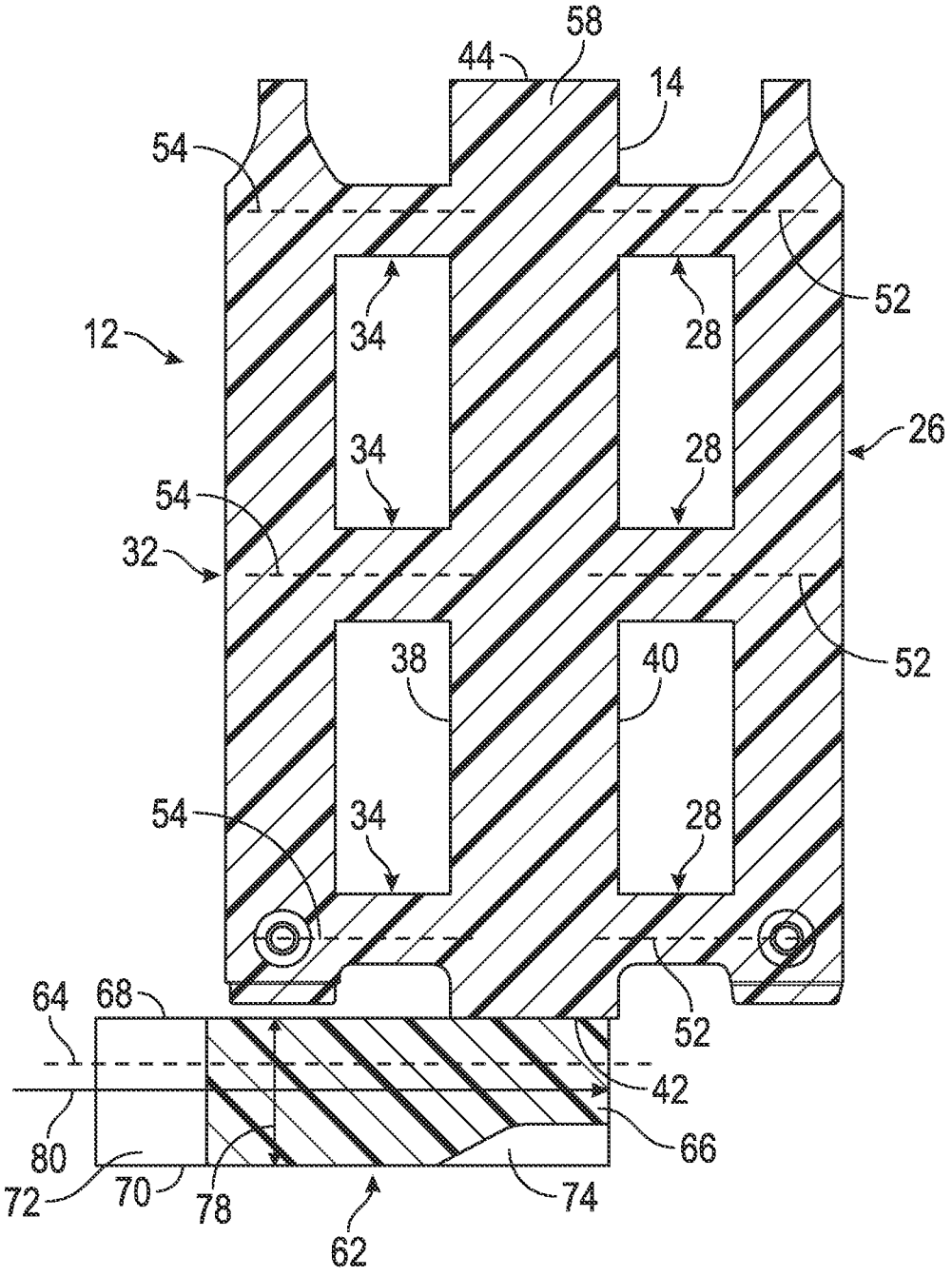
FIG. 11 is a representative cross-sectional perspective view of another embodiment of an axially-extending pattern segment and runner as disclosed herein.
Figure 12:
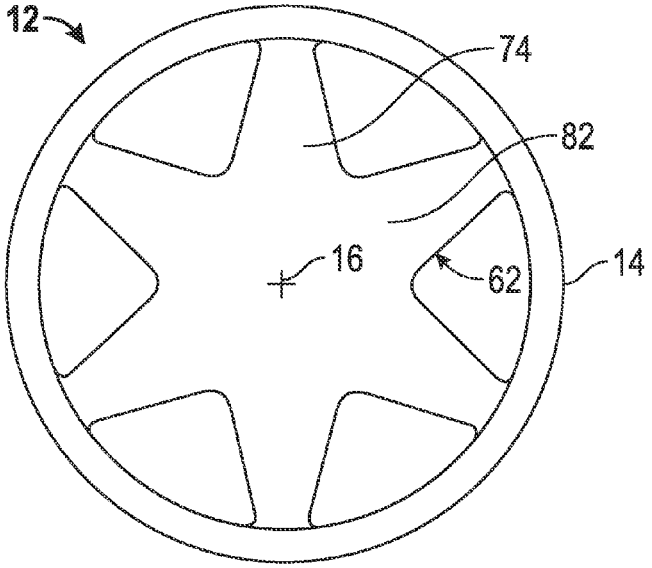
FIG. 12 is a top view of a hollow sprue and sprue wall and runner of an embodiment of a radial pattern assembly as disclosed herein.

The radial pattern assembly 10 may also include a runner 62 disposed proximate an end, including the lower end 42 or the upper end 44 of the hollow sprue 12. The runner 62 is used to form the portion of refractory mold 90 that provides a runner passageway that is used to feed molten metal from a melt pool to the sprue wall passageway. If the pattern assembly 10 described herein is to be used for conventional or gravity casting where the pattern assembly 10 is oriented to form a refractory mold 90 that is designed to have the molten metal supplied from above the refractory mold 90 and the runner 62, the runner 62 will generally be disposed proximate the upper end 44 of the hollow sprue 12. If the pattern assembly 10 described herein is to be used for countergravity casting where the pattern assembly 10 is oriented to form a refractory mold 90 that is designed to have the molten metal supplied from below the refractory mold 90 and the runner 62, the runner 62 will generally be disposed proximate the lower end 42 of the hollow sprue 12. The runner 62 may include a runner axis 64, and the runner and axis may be positioned in any suitable orientation with respect to the sprue wall 14, including so that it extends generally transverse to the longitudinal axis 16 or, for example, such that it extends radially upwardly (or downwardly) from the longitudinal axis 16 toward the hollow sprue 12. The runner 62 is formed from a second fugitive material 66, which may be the same material as fugitive material 58 or a different fugitive material. The runner 62 may have any suitable size and shape and may include features analogous to those described herein with regard to the hollow sprue 12 and sprue wall 14. In one embodiment, the runner 62 may be a continuous wall such that the wall is a solid closed form completely enclosing the end of the hollow sprue 12 to which it is attached and disposed about the longitudinal axis 16 of the hollow sprue 12 as illustrated, for example, in FIG. 9. Alternately, in other embodiments, the runner 62 may be a substantially closed form that includes one or more openings 72 or bores that extend through the runner 62 from the upper surface 68 to the lower surface 70, as illustrated, for example, in FIGS. 10 and 12. Runner 62 and openings 72 may form the shape of a central hub 82 and a plurality of spokes 74, for example, as shown in FIG. 12. Openings 72 may have any suitable shape or size and may be included in any number. Regardless of whether the runner 62 is a solid closed form or contains one or more openings 72, the runner 62 may include one or more recesses 75 that extend inwardly from the upper surface 68 or lower surface 70, or both surfaces, or protrusions 76 that extend outwardly from the upper surface 68 or lower surface 70, or both surfaces, or a combination of recesses 75 and protrusions 76, as illustrated schematically in FIGS. 10 and 11. The runner 62, including the overall shape form and predetermined thickness 78 and radial length 80, as well as the incorporation of openings 72, recesses 75 and protrusions 76, may be selected to provide a refractory mold that promotes predetermined metallodynamic flow of the molten metal within the mold during casting. This includes flow to and throughout the mold cavity or cavities, particularly the passageway(s) defined within the sprue wall 14 and passageways in the gate(s) 28 and the pattern 26 cavities to fill them during casting, as well as return flow back through the mold cavity, particularly the gate passageway and sprue wall passageways in the case of countergravity casting once the pressure used to fill the pattern cavities has been released. These features may be used to tailor the metallodynamic flow with the mold cavity during and/or after casting, particularly the flow into the passageways within the sprue wall 14, including increasing or decreasing the flow rate or the volume of the flow in a particular portion of the mold cavity, as well as the flow characteristics (e.g. laminar or turbulent flow). In the case of countergravity casting, once the pattern cavities are filled, it is very desirable to return as much of the molten metal from the other portions of the mold, including the gates and sprue wall as possible without negatively affecting the patterns, i.e. leaving the pattern cavities completely filled.

The runner 62 may be disposed within and attached to the inner surface 40 or an end of the hollow sprue wall 14, either the upper end 44 or the lower end 42, or a combination thereof. In one embodiment, the runner 62 includes a solid member attached about an inner periphery 24 proximate the lower end 42 of the sprue wall 14 as shown, for example, in FIG. 9. In another embodiment, the runner 62 includes a plurality of outwardly extending spokes 74 extending from a central hub 82, each spoke 74 attached proximate the lower end 42 of the sprue wall 14 as illustrated, for example, in FIG. 12.

As illustrated in FIGS. 1-13, the radial pattern assembly 10 may be formed as an assembly of a plurality of pattern segments 60, wherein the pattern segments 60 include at least one pattern 26, 32 and at least one corresponding gate, such as a radially outwardly extending gate 28 or a radially inwardly extending gate 34, and which may also include at least a portion 15, 17 of the sprue wall 14. The pattern segments 60 may also include a portion of the runner 62. The pattern segments 60 may also be combined with spacer segments 61 that include at least a portion of the sprue wall 14. The gates 28, 32 and sprue wall 14 portion of the pattern segments 60 and spacer segments 61 may also include the features described herein such as openings 36, as well as recesses 48 and protrusions 50 in the outer surface 38 or inner surface 40, or a combination thereof. The pattern segments 60 may include axially-extending pattern segments 60 where the axially-extending portions 15 of the sprue wall 14 extend substantially in the direction of longitudinal axis 16, or peripherally-extending pattern segments 60 where the peripherally-extending portions 17 of the sprue wall 14 extend substantially laterally to include the periphery of the wall, including extending substantially orthogonally to the longitudinal axis 16, or may include a combination of axially-extending and peripherally extending segments 60. The peripherally-extending pattern segments 60 may also be described as radially-extending pattern segments (e.g. ring-shaped segments) where the sprue wall 14 is cylindrical or also as laterally-extending pattern segments. The pattern segments 60 are formed from a fugitive material 58, as described herein. The pattern segments 60, including their portions 15, 17 of the sprue wall 14, patterns 26, 32 and gates 28, 34, may be formed from the same fugitive material 58 or from different fugitive materials as a matter of design choice to promote their removal in conjunction with the formation of a refractory mold thereon as described herein. A plurality of pattern segments 60, as well as spacer segments 61, if employed, may be assembled to provide a radial pattern assembly 10, as described herein. The pattern segments 60 employed, whether axially-extending segments 60 or peripherally-extending segments 60 may be the same or different from one another. The pattern segments 60 may be assembled together to form the radial pattern assembly 10 in any suitable manner, including direct bonds, such as welds formed between adjacent segments, various adhesives, glues or other joint materials used to adhere one segment to another, and various attachment devices, including those that are themselves formed from a fugitive material.

Figure 13:
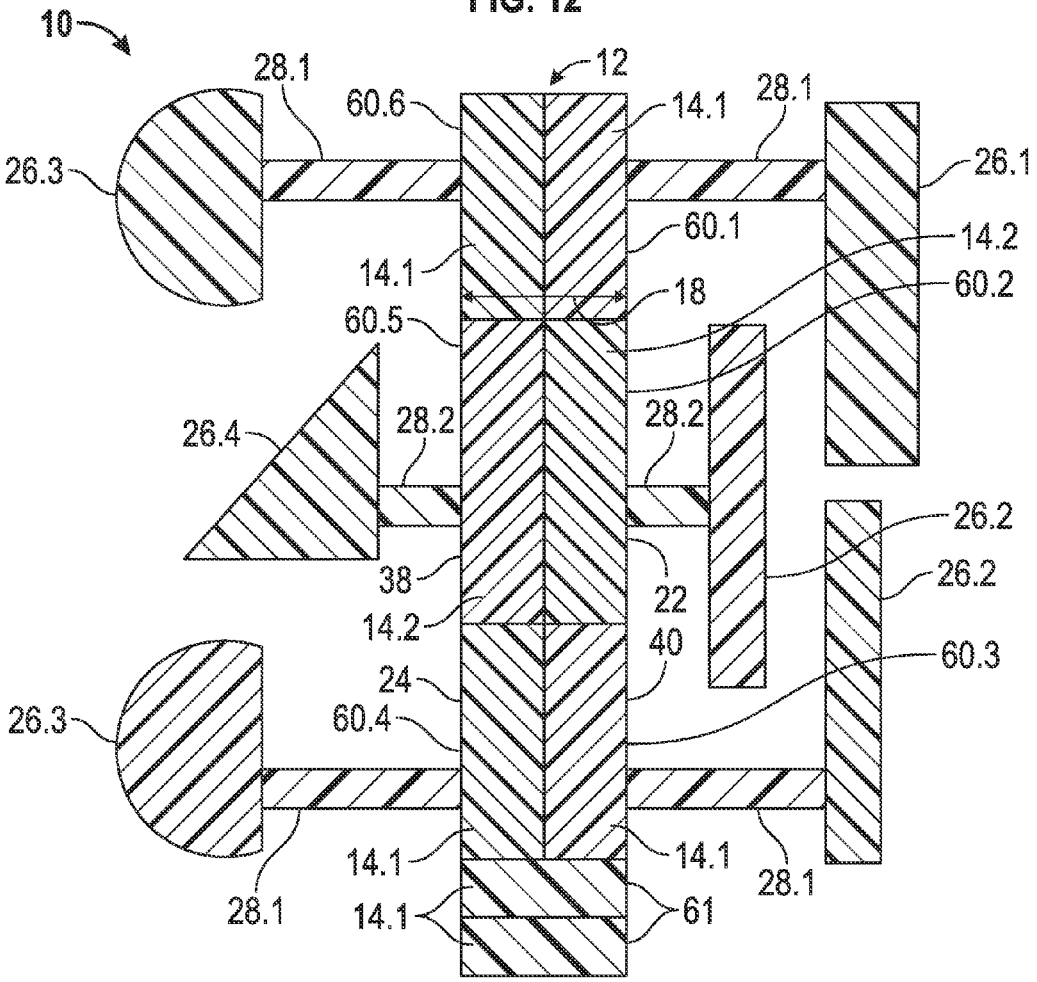
FIG. 13 is a representative cross-sectional view of a radial pattern assembly comprising a plurality of peripherally-extending pattern segments.

As illustrated in FIGS. 1 and 13, a radial pattern assembly 10 that includes a plurality of patterns 32 may include a plurality of the same pattern 26 (FIG. 1) or a plurality of different patterns 32.1-32.4 (FIG. 13), or a combination thereof, since FIG. 13 includes a plurality of the same patterns (e.g., more than one of each of 26.2 and 26.3, where 26.2 and 26.3 are different patterns).

As illustrated in FIGS. 1, 6A, 6B, 9, 10 and 11, for example, in one embodiment, the radial pattern assembly 10 may be formed as an assembly of a plurality of axially-extending pattern segments 60 that each include an axially-extending portion 15 (FIG. 6B) of the sprue wall 14, gate(s) 28 and pattern(s) 26. As discussed herein, the axially-extending pattern segments 60 may be selected to be the same or different depending on the predetermined design of the radial pattern assembly 10. For example, the gate(s) 28 and pattern(s) 26 used may be the same or different, or a combination thereof, according to the design requirements. Also, the axially-extending sections or portions 15 of the sprue wall 14 employed in the various pattern segments 60 may be selected to be the same or different, or a combination thereof, according to the design requirements, particularly the predetermined shape of the sprue wall 14, as described herein. For example, the plurality of adjoining sides of the plurality of adjacent portions 15, 17 may be selected to provide angles that affect a predetermined shape of the sprue wall 14, as in FIG. 1, for example. The axially-extending segments 60 may be joined to one another by any suitable joint 79 or fastening device 83, including an adhesive 84 (FIG. 1) disposed on one or both of abutting surfaces of the sprue wall portions; welds 85 (FIG. 9), including tack 86 or seam 87 welds, or a combination thereof, and various mechanical fasteners 88 that may be attached to or provide a joining device for abutting axially-extending segments 60 and their associated portions of the sprue wall, such as all manner of pins, stakes, straps, tabs, fixtures, frames, bands, cleats, staples, clips and other devices configured to form a mechanical joint or fasten one segment to another. Fastening device or devices 83 will also be configured for removal with the pattern assembly 10 and may also be formed from a suitable fugitive material 58, such as those described herein.

In another embodiment, the radial pattern assembly 10 may be formed as an assembly of a plurality of axially-extending pattern segments 60 that each include gate(s) 28 and pattern(s) 26 that are attached to an axially-extending sprue wall 14 that is formed as a separate component. This may be, for example, identical to the radial pattern assembly 10 of FIGS. 6A and 6B, except that only a pattern 26 and corresponding gates 28 form each pattern segment 60, while the sprue wall 14 is formed as one-piece and the axially-extending pattern segments 60, which also may be said to extend axially by virtue of the orientation of their patterns 26 or their overall orientation with respect to the sprue wall 14, are attached to the outer surface 38 of the sprue wall 14. In yet another embodiment, second patterns 32 and corresponding inwardly extending gates 34 may also be formed as pattern segments 60 and attached to the inner surface 40 of the sprue wall 14, either together with pattern segments 60 that include patterns 28 and outwardly extending gates 32, or separately, depending on the design requirements of the radial pattern assembly 10. The pattern segments 60 of this embodiment may be attached to the sprue wall 14 using the devices and methods described herein for joining the pattern segments 60 to one another.

As illustrated in FIG. 13, the radial pattern assembly 10 may include a plurality of substantially peripherally-extending pattern segments (e.g. 60.1-60.6), each substantially peripherally-extending pattern segment comprising a sprue wall section or portion 17 of the sprue wall 14. Similarly to what was described herein in conjunction with substantially axially-extending pattern segments (e.g., FIGS. 1-11), these pattern segments may have their portions 17 of the sprue wall, gate(s) 34 and pattern(s) 32 formed as a single piece or as separate pieces that are joined to one another. This may include a plurality of pattern segments (60.1-60.3) where the corresponding patterns are disposed radially outwardly of an outer periphery 22 of the section of the sprue wall 14, and the radially outwardly extending gate 28 is attached to and extending between the pattern and the section of the sprue wall (e.g., 60.1/14.1/34.1/32.1, 60.2/14.2/34.2/32.2 and 60.3/14.1/34.1/32.2). In these examples, differences in the tenths digit of the segment, sprue wall portion, gate and/or the pattern indicate a different segment, sprue wall portion, gate and/or pattern. The differences in the segments (e.g., 60.2 and 60.3) may be due to a difference in the type of pattern (e.g., 60.1 and 60.2) or due to a different location or placement of the same pattern on the segment (e.g., 60.1 and 60.3) or a difference in the portion of the segment comprising the sprue wall (e.g., 60.2 and 60.3), or a combination thereof. The differences in the segments may also include differences in the gates (e.g., 60.2/34.2 and 60.3/34.1 even though the patterns are the same (32.2)).

Similarly, this may include a plurality of substantially peripherally-extending pattern segments (60.4-60.6) where the corresponding patterns are disposed radially inwardly on an inner periphery 24 of the section of the sprue wall portion 14.1 or 14.2, and the radially inwardly extending gates 34.1 or 34.2 are attached to and extending between the patterns and the sections of the sprue wall (e.g., 60.4/14.1/34.1/32.3, 60.5/14.2/34.2/32.2 and 60.6/14.1/34.1/32.3). In these examples, differences in the tenths digit of the segment, sprue wall portions, gates and/or the patterns also indicate a different a different segment, sprue wall portion, gate and/or pattern. The differences in the segments (e.g., 60.4 and 60.5) may be due to a difference in the type of pattern (e.g., 60.4 and 60.5) or due to a different location or placement of the same pattern on the segment (e.g., 60.4 and 60.6) or a difference in the portion of the segment comprising the sprue wall (e.g., 60.5 and 60.6), or a combination thereof. As also shown in FIG. 13, the sprue wall 14 may also include a spacer segment 61 or a plurality of spacer segments 61 that comprise sprue wall portions 14.7 that do not include a gate or pattern, each spacer segment 61 comprises a spacer section of the sprue wall 14 and is used to extend the sprue wall 14 or space segments 60 from one another, whether the segments and spacers are substantially horizontal or substantially axially-extending segments and/or spacers. The thickness 18 of the sprue wall 14 may be formed from at least one substantially peripherally-extending sprue wall portion, but may also be formed from a plurality of substantially peripherally-extending sprue wall portions, including those having the abutting arrangement illustrated in FIG. 13. The length 20 of the sprue wall 14 is formed by stacking a plurality of substantially peripherally-extending sprue wall portions, including those having the abutting arrangement illustrated in FIG. 13. In addition to the abutting arrangement illustrated in FIG. 13, all manner of overlapping or abutting arrangements of adjacent sprue wall portions are contemplated, including combinations of overlapping and abutting arrangements. The peripherally-extending segments 60 may be joined to one another by any suitable fastening device or devices 83, including those described herein, which have been suitably adapted for use with the peripherally-extending segments 60.

The radial pattern assembly 10 may be assembled with or without the use of an assembly aid, such as a pattern fixture 89 as shown, for example, in FIG. 9. The pattern fixture 89 illustrated includes a platen for supporting the pattern assembly 10 and a shaft that provides a rotatable support for the platen.

Figure 14:
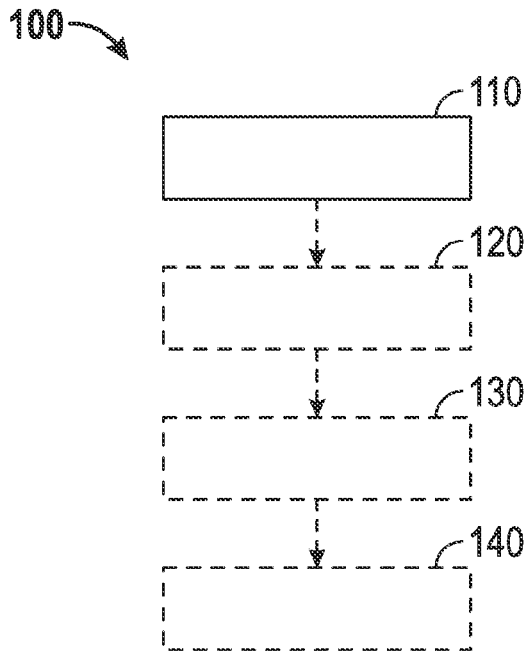
FIG. 14 is a flowchart illustrating an embodiment of a method of making a radial pattern assembly as disclosed herein.

Referring to the Figures, and more particularly to FIG. 14, a method 100 of making a radial pattern assembly 10 is disclosed. The method includes forming 110 a hollow sprue 12 comprising a sprue wall 14 disposed about a longitudinal axis 16 where the sprue wall having a thickness 18, a length 20 and a periphery, including in one embodiment an outer periphery 22 and an inner periphery 24 as described herein. The pattern assembly also includes a pattern 26 disposed outwardly of the sprue wall 14, and an outwardly extending gate 28 attached to and extending between the outer surface 38 of the sprue wall 14 and the pattern 26, the hollow sprue 12, pattern 26 and radially outwardly extending gate 28 each formed from a fugitive material 58, as describe herein. Forming 110 includes forming the elements described from a fugitive material 58, or a plurality of fugitive materials 58, as described herein. In one embodiment, forming 110 includes forming the hollow sprue 12, pattern 26 and outwardly extending gate 28 as a unitary pattern assembly 12, where these portions are formed together as a single piece. Forming 110 as a unitary pattern assembly 10 may be done in any suitable manner, which will generally depend on the fugitive material 58 selected. In one example, where the fugitive material 58 comprises a wax or a low melting point metal, a unitary pattern assembly 10 may be formed by casting the wax or metal using conventional casting techniques into a one-piece casting pattern or mold. In another example, where the fugitive material 58 comprises a polymer, including an expanded polymer, such as polystyrene, a unitary pattern assembly 10 may be formed by injecting the polymer using conventional injection molding techniques into a one-piece mold. In yet another example, where the fugitive material 58 comprises a polymer, a unitary pattern assembly 10 may be formed using an additive manufacturing process, such as 3D printing. Additive manufacturing, including 3D printing, takes virtual blueprints from computer aided design (CAD) or animation modeling software and "slices" them into digital cross-sections for input to a printer to successively additively lay down (i.e. print) a successive series of cross-sections of a pattern material. Depending on the machine and process used, a suitable pattern material, as described herein, and/or a binding material is deposited on the build bed or platform until material/binder layering is complete and the final 3D model has been "printed." It is a process where the virtual (math) model and the physical (printed) model are nearly identical. To perform a print, the printer receives the design in a standard file format (e.g. ".stl", ".ply" or ".wrl" files) and deposits successive layers of liquid, powder, or sheet material to build the model from the series of cross sections. These layers, which correspond to the virtual cross sections from the CAD model, are joined together or automatically fused to create the final shape. The primary advantage of this technique is its ability to create almost any shape or geometric feature, including all of the elements of a unitary pattern assembly 12, such as a sprue 12, the pattern(s) 26 and the outwardly extending gate(s) 28, as well as the runner(s) 62.

In another embodiment, forming 110 comprises forming the hollow sprue 12, pattern 26 and outwardly extending gate 28 as a plurality of components, such as where each is formed as a separate component or piece, or where aspects of these components are combined into a plurality of components or pieces, followed by joining the plurality of components to form the pattern assembly 10. Forming 110 of the plurality of components may be done in any suitable manner depending on the fugitive material 58 selected, including the use of various conventional casting or molding methods. In one example, forming 110 includes forming the hollow sprue 12, pattern 26 and gate 28 as a plurality of components followed by joining this plurality of components to form the pattern assembly 10. The plurality of components may each be formed from the same fugitive material 58. Alternately, the plurality of components may be formed from different fugitive materials 58, including forming each of the plurality of components from a different fugitive material 58. Joining may be performed using any appropriate joining apparatus or method, or a combination thereof. In one example, where the fugitive material is wax, joining may be accomplished by wax welding, such as by forming a bead along the periphery of the interface between the components being joined, or by heating all or a portion of one or both surfaces to be joined sufficiently to soften the wax, up to and including melting, to cause the adjoining surfaces to bond to one another and form a joint between them upon cooling. In another example, where the fugitive material 58 includes any of those materials described herein, and particularly where it includes a wax, the components may be joined to one another using various pins, stakes, straps, tabs, fixtures, frames, bands, cleats, staples, clips and other devices or members that may be used to form a joint 79 or act as a fastening device 83, or a combination thereof, formed from the same fugitive material 58 or a different (e.g. more rigid) fugitive material, including any of those fugitive materials 58 listed herein that are configured to join one component to another component, particularly including an immediately adjacent component. In yet another example, where the fugitive material 58 includes any of those materials described herein, and particularly where it is includes a wax, polymer or metal, the components may be joined to one another using various adhesives or glues, or a combination thereof, which are configured to join one component to another component, particularly including an immediately adjacent component. Forming 110 may also include forming of the features in the sprue wall 14 described herein, such as openings 36, recesses 48 and protrusions 50, whether directly during a casting or molding operation, or indirectly by secondary operations, such as machining or other known methods to add or remove material. For example, forming 110 may also optionally include removing 140 a portion of the sprue wall 14, such as by cutting or machining, to form an opening 36 in the sprue wall 14 as described herein.

The method 100 of forming the pattern assembly 10 may also include forming 120 a second pattern 32 disposed radially inwardly of the sprue wall 14 and a radially inwardly extending second gate 34 attached to and extending between the sprue wall and the second pattern, the second pattern and second gate each also formed from a second fugitive material 66, as described herein. Forming 120 may include a forming process for these elements that is entirely separate from forming 110, so that these elements are formed separately from the sprue wall 14, pattern 26 and gate 28. Where forming 120 of the inwardly extending members is separate from forming 110 of the outwardly extending members, in addition to the inwardly extending pattern 32 and inwardly extending gate 34, the portion of the radial pattern assembly 10 being formed may also include a portion of the sprue wall 14, particularly the inner surface 40 thereof. In one example, the sprue wall 14 may be formed as an inner member and an outer member, such as concentric or nested cylinders or sleeves, for example, where the outer member is formed together with patterns 26 and gates 28 and the inner member is formed together with the second patterns 32 and second gates 34. In this example, forming 120 is used to form a second portion of the radial pattern assembly that is joined to a first portion of the radial pattern assembly 10 formed by forming 110 to form the radial pattern assembly 10. Alternately, forming 120 may include forming the second patterns 32 and second gates 34 together with patterns 26, gates 28 and the sprue wall 14 as an integral or one-piece radial pattern assembly 10 in the manner described herein.

The method 100 of forming the radial pattern assembly 10 may also optionally include forming 130 a runner 62 and joining 140 the runner 62 proximate an end, including lower end 42 and upper end 44 as described herein, of the hollow sprue 12 and sprue wall 14 with the runner 62 disposed about the longitudinal axis 16 and joined to the sprue wall 14 as also described herein. In one embodiment, the runner 62 may also be formed together with the sprue wall 14, patterns 26 and gates 28 as a unitary or one-piece pattern assembly 10 by the methods described herein, such as casting or injection molding, for example. In another embodiment, forming 130 of the runner 62 may include being formed separately in conjunction with the formation of the other plurality of components, or as a portion of one of the other plurality of components by the methods described herein, such as casting or injection molding, for example, and joined together with the other plurality of components as described herein. In this case, forming 110 further comprises forming a runner 62 as one of the separate components and joining further comprises joining the runner 62 to form the pattern assembly 10. Forming 120 of the runner 62 may also include the forming of features, such as openings 72, recesses 75 or protrusions 76, in the runner as described herein, whether directly during a casting or molding operation, or indirectly by secondary operations, such as machining or other known methods to add or remove material.

Figure 15:
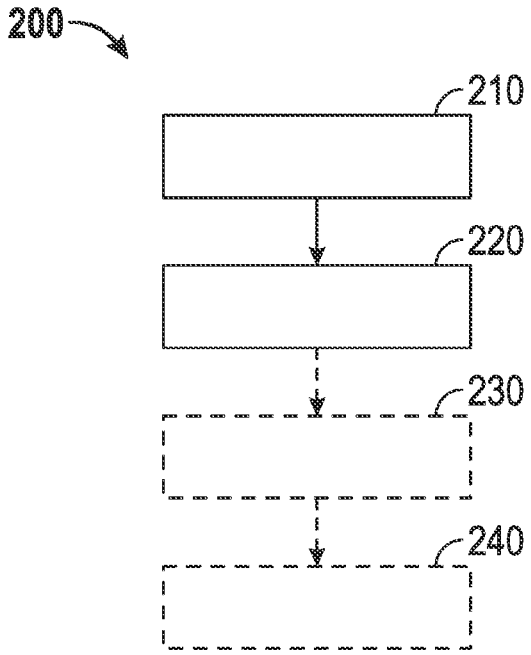
FIG. 15 is a flowchart illustrating a second embodiment of a method of making a radial pattern assembly as disclosed herein.

Referring to FIG. 15, in one embodiment, the radial pattern assembly 10 may be formed by a method 200 that uses a plurality of pattern segments 60, as described herein. The method 200 includes forming 210 a plurality of pattern segments 60, each pattern segment comprising a pattern section or portion 15, 17 of a sprue wall 14, a pattern(s) 26, 32 spaced away from the section or portion of the sprue wall 14, and a gate(s) 28, 34 attached to and extending between the pattern(s) and the pattern section or portion of the sprue wall. Each pattern segment 60 may also include a runner 62 or a portion of a runner as described herein. The plurality of pattern segments 60 are formed from a fugitive material as described herein. The method 200 also includes joining 220 the pattern sections or portions 15, 17 of the sprue wall 14 to form the sprue wall, wherein the sprue wall comprises a hollow sprue 12 disposed about a longitudinal axis, and wherein the patterns 26 are spaced apart from the hollow sprue and the gates 28 extend between the hollow sprue and the patterns. In one embodiment of method 200, the gates 28 include outwardly extending gates 26, with each outwardly extending gate extending outwardly from the respective portion 15, 17 of the sprue wall 14 to a respective one of the patterns 26. In another embodiment of method 200, the gates include inwardly extending gates 34, with each inwardly extending gate extending inwardly of the sprue wall 14 to a respective one of the patterns 32. In yet another embodiment of method 200, the gates include outwardly extending gates 28 and inwardly extending gates 34, each outwardly and inwardly extending gate 28, 34 extending outwardly and inwardly, respectively, from the sprue wall 14 to a respective one of the patterns 26, 32.

In one embodiment of method 200, the pattern sections or portions 15 of the sprue wall 14 are substantially axially-extending pattern sections, as described herein. In this embodiment, joining 220 may include forming an axially-extending joint 79 between substantially axially-extending pattern sections or portions 15. Any suitable joint 79 or fastening device 83 described herein may be employed for joining 220. In one example, the fugitive material 58 may include a wax and the axially-extending joint 79 comprises a wax weld 85.

In another embodiment of method 200, the pattern sections or portions 17 of the sprue wall 14 are substantially peripherally-extending pattern sections, as described herein. In this embodiment, joining 220 may include forming a peripherally-extending joint between substantially peripherally-extending pattern sections or portions 17. In one example, the fugitive material 58 may include a wax and the axially-extending joint 79 comprises a wax weld 85.

In other embodiments of method 200, the pattern sections or portions 15,17 of the sprue wall 15 may include substantially axially-extending and circumferentially extending pattern sections. In this embodiment, joining 220 may include forming both axially extending and peripherally-extending joints between axially-extending and peripherally-extending pattern sections or portions 15, 17. In one example, the fugitive material 58 may include a wax and the axially-extending and peripherally-extending joints 79 comprise wax welds 85.

The method 200 may also include forming 230 at least one spacer segment 61 comprising at least one spacer section or portion of the sprue wall 14, and joining the pattern section or portion further comprises joining the pattern section and the at least one spacer section to form the sprue wall 14.

Figure 16:
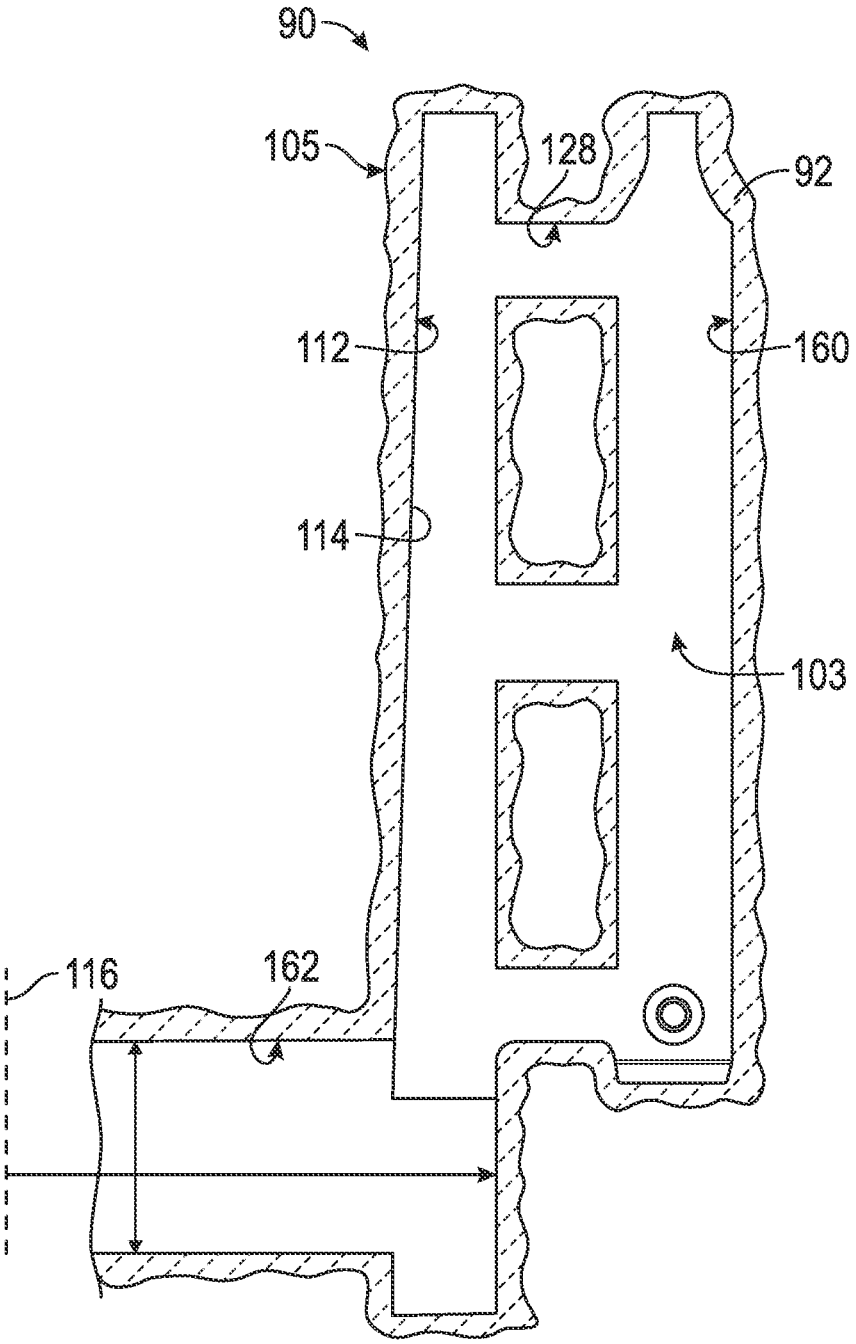
FIG. 16 is an exemplary embodiment of a refractory mold as disclosed herein.

Referring to the figures, and particularly to FIG. 16, the radial pattern assembly 10 may be used for any suitable purpose and is particularly designed for use as a pattern in the manufacture of a refractory mold 90 for casting. Refractory mold 90 may be used for any suitable type of casting, but is particularly suitable for use as a mold for all manner of investment casting, including all manner of gravity and countergravity investment casting. The refractory mold 90 may be formed as described herein by depositing a refractory material 92 on an outer surface 102 of the radial pattern assembly 10 to form a refractory mold assembly 105. As such, the refractory mold assembly 105 includes a fugitive radial pattern assembly 10 comprising a hollow sprue 12 that comprises a sprue wall 14 disposed about a longitudinal axis 16; a pattern 26 disposed outwardly of the sprue wall 14; and an outwardly extending gate 28 attached to and extending between the sprue wall 14 and the pattern 26, the hollow sprue 12, pattern 26 and gate 28 each formed from a fugitive material; and a refractory mold 90 formed on and having a mold cavity 103 defined by the outer surface 102 of the fugitive radial pattern assembly 10.

The fugitive material 58 of the radial pattern assembly 10 is removed from the refractory mold assembly 105 to provide the refractory mold 90 having a mold cavity 103 that is defined by the outer surface 102 of the radial pattern assembly 10. The mold cavity 103 of the refractory mold 90 includes hollow sprue portion 112 that comprises a sprue wall portion 114 disposed about a longitudinal axis 116. The refractory mold 90 also includes a pattern portion 126 of the mold cavity 103 disposed outwardly of the sprue wall portion 114. The refractory mold 90 further includes an outwardly extending gate portion 128 of the mold cavity 103 attached to, extending and providing fluid communication between the sprue wall portion 114 and the pattern portion 126. The refractory mold 90 may have any of the mold cavity 103 shapes defined by the outer surface 102 of the radial pattern assembly 10 configurations described herein and may have portions of the mold cavity 103 that correspond to the various portions of the radial pattern assemblies 10 described herein, including, for example, various hollow sprue portions 112 that comprise various sprue wall portions 114, as well as pattern portions 126 and outwardly extending gate portions 128. In one embodiment, for example, the hollow sprue portion 112 may include a hollow cylindrical sprue portion 112 of the mold cavity. In another embodiment, the pattern portion 126 may include a plurality of pattern portions 126 disposed about the outer surface portion 138 of the hollow sprue portion 112 of the mold cavity 103. The portions of the mold cavity 103 noted herein have reference numbers that are incremented by 100 from the reference numbers of the corresponding members of the radial pattern assembly 10 used to form these portions of the refractory mold assembly 105. This also includes, for example, various hollow sprue portions 112 that comprise various sprue wall portions 114, as well as second pattern portions (not shown) disposed inwardly of the sprue wall portion 114 and inwardly extending gate portions (not shown) attached to, extending and providing fluid communication between the sprue wall portions 114 and the second pattern portions 132. This also may include configurations of the refractory mold 90 and mold cavity 103 that include various combinations of the outwardly and inwardly extending portions of the mold cavity 103 as described herein. The various portions of the mold cavity 103 of the refractory mold 90 are interconnected with one another and provide fluid passageways for fluid communication therebetween. This includes fluids comprising hot gases, such as combustion gases, for the purpose of burnout of the radial pattern assembly 10 from the refractory mold 90, as well as fluids comprising molten materials as they are cast into the refractory mold 90 and mold cavity 103 and solidified to form cast articles.

As described herein, the fugitive radial pattern assembly 10 may also include a runner 62 disposed proximate an end of the hollow sprue 12 and sprue wall 14, including a lower end 42 or an upper end 44, wherein the refractory mold 90 is also formed on the outer surface 102 of a radial pattern assembly 10 that includes the runner 62 and thus includes a runner portion 162 of the mold cavity 103. This may include runner portions 162 having all of the configurations of the runners 62 described herein. In one embodiment, for example, the runner 62 is disposed within and attached to an inner surface of the sprue wall 14, and the runner portion 162 of the mold cavity 103 is disposed within and attached to and in fluid communication with an inner surface portion of the sprue wall portion 114. In another embodiment, the runner 62 is disposed proximate a lower end 42 of the sprue wall 14, and the runner portion 162 of the mold cavity 103 is attached to and in fluid communication with the lower end portion of the mold cavity 103. In yet another embodiment, the runner 62 comprises a plurality of outwardly extending spokes 74 extending from a central hub 82, each spoke attached to an inner surface 40 of the sprue wall 14 on an outer end and the hub 82 on an inner end, and the runner portion 162 of the mold cavity 103 comprises a plurality of outwardly extending spoke portions 174, each spoke portion is attached to and in fluid communication with an inner surface portion of the sprue wall portion 114 of the mold cavity 103 and a hub portion 182 of the mold cavity 103.

The refractory mold 90 and the mold cavity 103 are defined and bounded by an inner surface 107 of the refractory mold wall 104 formed of refractory material 92. The refractory mold wall 104 may have any suitable wall thickness sufficient to form the refractory mold 90 and define the mold cavity 103. The wall thickness may vary depending on many factors, including the overall size, shape and other aspects of the mold configuration including the hollow sprue portion, and particularly the number, size, shape and spacing of the pattern portions and gate portions. Additional factors affecting the selection of the refractory material 92 of the mold wall 104 include whether the mold 90 is to be self-supporting during casting or placed within and partially supported by a support medium (e.g. a refractory particulate medium, such as casting sand). In one embodiment, mold wall 104 has a thickness of less than about 0.12 inches. In one embodiment, the mold wall 104 may include a homogeneous refractory material 92. In another embodiment, the refractory mold 90 includes a mold wall 104 that comprises a plurality of layers of a dried refractory slurry of a refractory material 92 that are sintered together to form the wall. Any suitable refractory material 92 may be used to form the mold wall 104 from a slurry or otherwise. These include zircon, fused silica, silica, an alumino silicate, mullite, or fused alumina, or a combination thereof. The refractory material 92 and other aspects of the mold wall, including its thickness, may be selected to provide a mold wall 104 that is gas permeable or gas impermeable.

Figure 17:
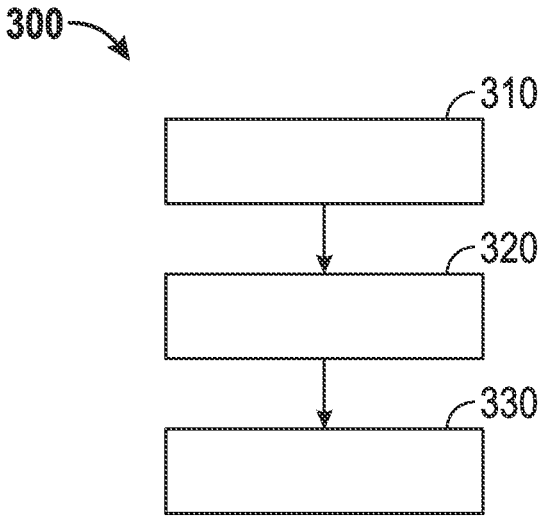
FIG. 17 is a flowchart illustrating an embodiment of a method of making a refractory mold.

The refractory mold 90 may be formed using radial pattern assembly 10 by any suitable method of making a refractory mold. Referring to FIGS. 16 and 17, in one embodiment, the refractory mold 90 may be formed from a slurry of refractory material 92 by a method 300. The method 300 includes forming 310 a fugitive pattern assembly 10 comprising a hollow sprue 12 that comprises a sprue wall 14 disposed about a longitudinal axis 16; a pattern 26 disposed outwardly of the sprue wall 14; and an outwardly extending gate 28 attached to and extending between an outer surface 38 of the sprue wall 14 and the pattern 26, the hollow sprue 12, pattern 26 and gate 28 each formed from a fugitive material. According to the method 300, the pattern assembly 10 may include any of the radial pattern assemblies 10 described herein and forming 310 may include any suitable method of forming the pattern assembly, including, for example, the method 200 described herein. In one embodiment, forming 310 the pattern assembly 10 further includes forming a runner 62; and joining the runner proximate an end 42, 44 of the hollow sprue 12, the runner 62 disposed about the longitudinal axis 16 and joined to the sprue wall 14.

The method 300 also includes depositing 320 a refractory mold 90 on an outer surface 102 of the fugitive pattern assembly 10, the refractory mold having a mold cavity 103 defined by the outer surface 102 of the fugitive radial pattern assembly 10 and having the features and advantages described herein. Depositing 320 may include any suitable method of depositing the refractory mold 90. In one embodiment, depositing 320 the refractory mold 90 comprises forming a plurality of layers of a refractory material 92 by dipping the radial pattern assembly 10 into a refractory slurry comprising a liquid carrier medium and a particles of a refractory material 92 to deposit a layer of the slurry on the outer surface 102 of the radial pattern assembly and drying to remove the liquid carrier medium to form a dried layer of the refractory material 92, and then repeating these steps to form subsequent dried layers of the refractory material and thereby create a refractory mold 90 in an unsintered condition (i.e. the refractory mold precursor). In one embodiment, the unsintered refractory mold 90 may include a single layer of the refractory material 92, and in other embodiments may include a plurality of layers of the refractory material 92, including two or more layers, and more particularly 2-5 layers. Any suitable refractory slurry or combination of different refractory slurries and refractory materials 92 may be used to form the refractory mold 90, including those described in U.S. Pat. No. 5,069,271 to Chandley et al., which is incorporated herein by reference in its entirety.

In one embodiment, the method 300 may also include heating 330 the refractory mold to remove the fugitive pattern assembly 10 or sinter the refractory mold 90, or a combination thereof. Heating 330 to remove the fugitive pattern assembly 10 or sinter the refractory mold 90 may be accomplished by any suitable heating apparatus and method. In the case where the fugitive material 58 comprises a wax, the heating 330 may include dewaxing. In one embodiment, heating 330 may include inserting an unsintered refractory mold precursor that has been deposited on the fugitive pattern assembly 10 as described herein into a mold furnace, including all manner of conventional mold furnaces, wherein the furnace is controlled to provide a temperature profile sufficient to remove the fugitive pattern material. This may include any suitable process or mechanism whereby heat may be used to remove the fugitive pattern material 58 from the refractory mold 90. This includes, for example, melting the fugitive pattern material 58 so that it flows out of openings in the mold cavity 103 by gravity as may be used effectively with various pattern waxes and/or metals having a low melting point. This may also include pyrolysis of the fugitive pattern material 58 so that it flows out of openings in the mold cavity 103 or through the mold wall 104, in cases where the mold wall is gas permeable, as may be used effectively for various waxes and other polymeric materials, including, for example, various expanded or foamed polymers, such as expanded polystyrene. This may also include combinations of the above where the fugitive pattern material 58 is removed by a combination of melting and pyrolysis, for example. In one embodiment, heating 330 may be performed using a gas-fired mold heater to remove the fugitive material 58, such as by a combination of pyrolysis and melting. In another embodiment, heating 330 may be performed using a steam autoclave to remove the fugitive material 58, such as by melting.

In addition to removing the fugitive pattern material 58, heating 330 the refractory mold may also encompass heating the refractory mold 90 in an unsintered condition (i.e. a refractory mold precursor) sufficiently to sinter the refractory material 92, including any binder materials utilized in the slurry, and form a refractory mold 90 in a sintered condition, wherein the particulates of the refractory material 92 and any other constituents (e.g. binder materials) from the slurry are bonded together to form a ceramic shell or investment having a strength sufficient to retain the material to be cast into the mold. Any suitable refractory material 92 may be used in the slurry used to create the investment, including silica, zircon, various aluminum silicates, or alumina, or a combination thereof. Silica may include fused silica as well as quartz. In an embodiment, aluminum silicates may include mixtures of alumina and silica, such as, for example, an alumina content from about 42 to about 72% (e.g. mullite). Any suitable binder may be used to bind the refractory material(s) 92, including ethyl silicate (e.g. alcohol-based and chemically set), colloidal silica (e.g. water-based, also known as silica sol, set by drying), or sodium silicate, or a combination thereof, including, for example, a hybrid of these constituents controlled for pH and viscosity. Heating 330 may include any suitable combination of temperature/time sufficient to sinter the refractory material 92 and form refractory mold 90 in the sintered condition, such as, for example, temperatures in the range of about 1600° F. (871° C.) to about 2000° F. (1093° C.), and more particularly about 1800° F. (982° C.) to about 2000° F. (1093° C.). In one embodiment, sintering may be performed at a temperature of about 1800° F. (982° C.) for about 90 minutes. Sintering may be performed under any suitable atmosphere, including oxidizing, reducing or inert atmospheres, and more particularly may be performed in air.

Figure 18:
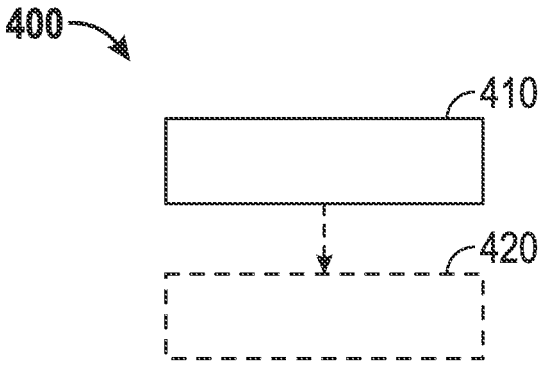
FIG. 18 is a flowchart illustrating a second embodiment of a method of making a refractory mold.

The refractory mold 90 having the form described herein may be formed using any suitable method of making a refractory mold. Referring to FIGS. 16 and 18, in one embodiment, the refractory mold 90 may be formed by a method 400 that includes additive manufacturing 410 of a mold 90 in an unsintered condition (i.e. a mold precursor) comprising refractory material 92 without the use of a pattern, such as by 3D printing of a refractory mold assembly 105. Additive manufacturing, including 3D printing, takes virtual blueprints from computer aided design (CAD) or animation modeling software, as described herein, and "slices" them into digital cross-sections for input to a printer to successively additively lay down (i.e. print) a successive series of cross-sections of the refractory material 92. Additive manufacturing may include 3D printing of particles of refractory material 92, such as by 3D printing of a slurry comprising binders and refractory materials 92 as described herein, as well as a suitable carrier medium, including a liquid carrier medium, as described herein. Additive methods may include, for example, stereolithography (SLA), including digital light processing (DLP) printing wherein a suitable 3D printer exposes a photopolymer binder filled with the refractory material 92 to light from a digital light processing (DLP) projector. The light polymerizes the binder to form a cross-sectional layer of the printed object.

Once a precursor of the mold 90 and mold assembly 105 has been formed, the method 400 may also include heating 420 the refractory material 92 to form the mold 90 and mold assembly 105 in a sintered condition, as described herein. The mold 90 and mold assembly 105 may be sintered using any suitable sintering process, as described herein.

In other embodiments, the method 400 may combine additive manufacturing 410, such as 3D printing and heating 420 to sinter the refractory material. These may include, for example, selective laser sintering (SLS) wherein a high power laser (for example, a carbon dioxide laser) is used to fuse small particles of refractory material 92 or binder into a mass that has a desired three-dimensional shape.

In the case of additive manufacturing, the refractory mold 90 having a mold cavity 103 is no longer defined by the outer surface of a pattern assembly, but rather is formed directly by additive processes, such as 3D printing. The resulting mold 90; however, may include all of the features of the mold assembly 105 made using a pattern assembly, as described herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A refractory mold, comprising:

a fugitive pattern assembly comprising a hollow sprue that comprises a sprue wall disposed about a longitudinal axis; a plurality of patterns disposed outwardly of the sprue wall; and a plurality of outwardly extending gates attached to and extending between the sprue wall and the pattern, the hollow sprue comprising a plurality of *horizontally* joined individual pattern segments, *wherein the horizontally joined individual pattern segments are not stacked on top of each other,* each pattern segment comprising an axially-extending pattern section of the sprue wall, a pattern spaced away from the pattern section of the sprue wall, and a gate attached to and extending between the pattern and the pattern section of the sprue wall, the pattern sections of the sprue wall joined to form the assembly, the hollow sprue, patterns and gates each formed from a fugitive material; and a refractory mold formed on and having a mold cavity defined by an outer surface of the fugitive pattern assembly including the hollow sprue portion comprising joined pattern segments.

2. The refractory mold of claim 1, wherein the fugitive pattern assembly further comprises a runner disposed proximate an end, and wherein the refractory mold is also formed on an outer surface of the runner and comprises a runner portion of the mold cavity.

3. [The refractory mold of claim 2] *A refractory mold, comprising:*

*a fugitive pattern assembly comprising a hollow sprue that comprises a sprue wall disposed about a longitudinal axis; a plurality of patterns disposed outwardly of the sprue wall; and a plurality of outwardly extending gates attached to and extending between the sprue wall and the pattern, the hollow sprue comprising a plural-*

*ity of vertically joined individual pattern segments, each pattern segment comprising an axially-extending pattern section of the sprue wall, a pattern spaced away from the pattern section of the sprue wall, and a gate attached to and extending between the pattern and the pattern section of the sprue wall, the pattern sections of the sprue wall joined to form the assembly, the hollow sprue, patterns and gates each formed from a fugitive material; and*

*a refractory mold formed on and having a mold cavity defined by an outer surface of the fugitive pattern assembly including the hollow sprue portion comprising joined pattern segments,*

*wherein the fugitive pattern assembly further comprises a runner disposed proximate an end, and wherein the refractory mold is also formed on an outer surface of the runner and comprises a runner portion of the mold cavity*, wherein the runner is disposed within and attached to an inner surface of the sprue wall.

4. The refractory mold of claim 2, wherein the runner is disposed proximate a lower end of the sprue wall.

5. [The refractory mold of claim 2] *A refractory mold, comprising:*

*a fugitive pattern assembly comprising a hollow sprue that comprises a sprue wall disposed about a longitudinal axis; a plurality of patterns disposed outwardly of the sprue wall; and a plurality of outwardly extending gates attached to and extending between the sprue wall and the pattern, the hollow sprue comprising a plurality of vertically joined individual pattern segments, each pattern segment comprising an axially-extending pattern section of the sprue wall, a pattern spaced away from the pattern section of the sprue wall, and a gate attached to and extending between the pattern and the pattern section of the sprue wall, the pattern sections of the sprue wall joined to form the assembly, the hollow sprue, patterns and gates each formed from a fugitive material; and*

*a refractory mold formed on and having a mold cavity defined by an outer surface of the fugitive pattern assembly including the hollow sprue portion comprising joined pattern segments,*

*wherein the fugitive pattern assembly further comprises a runner disposed proximate an end, and wherein the refractory mold is also formed on an outer surface of the runner and comprises a runner portion of the mold cavity*, wherein the runner comprises a plurality of outwardly extending spokes, each spoke attached to an inner surface of the sprue wall.

6. The refractory mold of claim 2, wherein the hollow sprue comprises a hollow cylindrical sprue.

7. The refractory mold of claim 2, wherein the pattern comprises a plurality of patterns disposed about the outer surface of the hollow sprue.

8. [The refractory mold of claim 2] *A refractory mold, comprising:*

*a fugitive pattern assembly comprising a hollow sprue that comprises a sprue wall disposed about a longitudinal axis; a plurality of patterns disposed outwardly of the sprue wall; and a plurality of outwardly extending gates attached to and extending between the sprue wall and the pattern, the hollow sprue comprising a plurality of vertically joined individual pattern segments, each pattern segment comprising an axially-extending pattern section of the sprue wall, a pattern spaced away from the pattern section of the sprue wall, and a gate attached to and extending between the pattern and the pattern section of the sprue wall, the pattern sections of the sprue wall joined to form the assembly, the hollow sprue, patterns and gates each formed from a fugitive material; and*

*a refractory mold formed on and having a mold cavity defined by an outer surface of the fugitive pattern assembly including the hollow sprue portion comprising joined pattern segments,*

*wherein the fugitive pattern assembly further comprises a runner disposed proximate an end, and wherein the refractory mold is also formed on an outer surface of the runner and comprises a runner portion of the mold cavity*, wherein the pattern assembly further comprises:

a second pattern disposed inwardly of the sprue wall; and an inwardly extending second gate attached to and extending between the sprue wall and the second pattern, the second pattern and second gate each also formed from a second fugitive material, and wherein the refractory mold is also formed on an outer surface of the second pattern and the second gate and comprises a second portion of the mold cavity.

9. The refractory mold of claim 1, wherein the fugitive material comprises a wax, polymer, metal, ceramic, clay, wood, or inorganic material, or a combination thereof.

10. The refractory mold of claim 1, wherein the refractory mold comprises a mold wall comprising a plurality of layers of a dried refractory slurry.

11. The refractory mold of claim 10, wherein the dried refractory slurry comprises zircon, fused silica, silica, an [alumino silicate] *aluminosilicate*, mullite or fused alumina, or a combination thereof.

12. The refractory mold of claim 10, wherein the mold wall has a thickness of less than about 0.12 inches.

13. The refractory mold of claim 10, wherein the mold wall is gas permeable.

14. A method of making a refractory mold, comprising:

forming a fugitive pattern assembly comprising a hollow sprue that comprises a sprue wall disposed about a longitudinal axis; a pattern disposed outwardly of the sprue wall; and [a] *an* outwardly extending gate attached to and extending between an outer surface of the sprue wall and the pattern, the hollow sprue comprising a plurality of *horizontally* joined individual pattern segments, *wherein the horizontally joined individual pattern segments are not stacked on top of each other*, each pattern segment comprising an axially-extending [or peripherally-extending] pattern section of the sprue wall, a pattern spaced away from the pattern section of the sprue wall, and a gate attached to and extending between the pattern and the pattern section of the sprue wall, the pattern sections of the sprue wall joined to form the assembly, the hollow sprue, pattern and gate each formed from a fugitive material; and depositing a refractory mold on an outer surface of the fugitive pattern assembly, the refractory mold having a mold cavity defined by the outer surface of the fugitive pattern assembly including the hollow sprue portion comprising joined pattern segments.

15. The method of claim 14, further comprising heating the refractory mold to remove the fugitive pattern assembly or sinter the refractory mold, or a combination thereof.

16. [The method of claim 14, wherein forming the pattern assembly further comprises] *A method of making a refractory mold, comprising*:

*forming a fugitive pattern assembly comprising a hollow sprue that comprises a sprue wall disposed about a longitudinal axis; a pattern disposed outwardly of the sprue wall; and an outwardly extending gate attached to and extending between an outer surface of the sprue wall and the pattern, the hollow sprue comprising a plurality of horizontally joined individual pattern segments, each pattern segment comprising an axially-extending pattern section of the sprue wall, a pattern spaced away from the pattern section of the sprue wall, and a gate attached to and extending between the pattern and the pattern section of the sprue wall, the pattern sections of the sprue wall joined to form the assembly, the hollow sprue pattern and gate each formed from a fugitive material;*

*depositing a refractory mold on an outer surface of the fugitive pattern assembly, the refractory mold having a mold cavity defined by the outer surface of the fugitive pattern assembly including the hollow sprue portion comprising joined pattern segments;* forming a runner from a fugitive material; and joining the runner proximate an end of the hollow sprue, the runner disposed about the longitudinal axis and joined to the sprue wall.

17. The method of claim 14, wherein depositing the refractory mold comprises forming a plurality of layers of a refractory material.

18. The method of claim 17, wherein forming a plurality of layers of a refractory material comprises:

dipping the fugitive pattern assembly in a slurry comprising a refractory material to form a slurry layer; and drying the slurry to form a dried slurry layer.

19. The method of claim 18, further comprising repeating dipping and drying to form a plurality of slurry layers.

20. The method of claim 18, wherein the refractory material comprises zircon, fused silica, silica, an [alumino silicate] *aluminosilicate*, mullite, or fused alumina, or a combination thereof.

21. The method of claim 18, wherein the slurry is selected to provide a gas permeable refractory mold.

22. The method of claim 14, wherein the pattern segments are formed by 3D printing.

23. A refractory mold, comprising:

a fugitive pattern assembly comprising a hollow sprue that comprises a sprue wall disposed about a longitudinal axis; a plurality of patterns disposed outwardly of the sprue wall; and a plurality of outwardly extending gates attached to and extending between the sprue wall and the pattern, the hollow sprue comprising a plurality of joined individual pattern segments, each pattern segment comprising an axially-extending [or a peripherally-extending] pattern section of the sprue wall, a pattern spaced away from the pattern section of the sprue wall, and a gate attached to and extending between the pattern and the pattern section of the sprue wall, the pattern sections of the sprue wall joined to form the assembly, the hollow sprue, pattern and gate each formed from a fugitive material;

*a runner joined to proximate an end of the hollow sprue, the runner disposed about the longitudinal axis and joined to the sprue wall;* and a refractory mold formed on and having a mold cavity defined by an outer surface of the fugitive pattern assembly including the hollow sprue portion comprising joined pattern segments.

24. The refractory mold of claim 23, wherein the pattern segments are formed by 3D printing.

* * * * *